United States Patent [19]
Ravin et al.

[11] Patent Number: 5,819,265
[45] Date of Patent: Oct. 6, 1998

[54] PROCESSING NAMES IN A TEXT

[75] Inventors: Yael Ravin; Misook A. Choi, both of Mt. Kisco; Faye Nina Wacholder, Roslyn Heights, all of N.Y.

[73] Assignee: International Business Machines Corporation, Armonk, N.Y.

[21] Appl. No.: 678,849

[22] Filed: Jul. 12, 1996

[51] Int. Cl.$^6$ .................................................. G06F 17/30
[52] U.S. Cl. .................... 707/5; 704/2; 704/8; 704/9; 704/10; 707/1; 707/532; 707/536
[58] Field of Search .................... 707/5, 1, 532, 707/536; 704/2, 8, 9, 10

[56] References Cited

U.S. PATENT DOCUMENTS

| | | | |
|---|---|---|---|
| 4,864,501 | 9/1989 | Kucera et al. | 704/8 |
| 4,868,750 | 9/1989 | Kucera et al. | 704/8 |
| 5,287,278 | 2/1994 | Rau | 364/419.1 |
| 5,383,121 | 1/1995 | Latkeman | 704/9 |
| 5,510,981 | 4/1996 | Berger et al. | 704/2 |

OTHER PUBLICATIONS

P. Hayes, "NameFinder: Software that finds Names in Text", Proceedings of RIAO '94, vol. 1, pp. 762–774,m Oct. 1994, New York. ISBN 2–905450–05–3.

Web pages for Name Tag at Http: // projects.sra.com/nametag.

S. Coates–Stephens, "The Analysis and Acquisition of Proper Names for the Understanding of Free Text," Computers and the Humanities, vol. 26, pp. 441–456, 1993.

D. D. McDonald, "Internal and External Evidence in the Identification and Semantic categorization of Proper Names," in B. Boguraev and J. Pustejovsky, eds. Acquisition of Lexical Knowledge from Text: Proceedings of a Workshop Sponsored by the special interest Group on the Lexicon of the Association for Computational Linguistics, pp. 32–43, Columbus, Ohio, 1993.

W. Paik, E.D. Liddy, E. Yu and M. McKenna, "Categorizing and standardizing Proper Nouns for efficient information Retrieval, " in B. Boguraev and J. Pustejovsky, eds. Axquisition of Lexical Knowledge from Text: Proceedings of a Workshop Sponsored by the Special Interest Group on the Lexicon of the Association for Computational Linguistics, 154–160, Columbus, Ohio, 1993.

W. B. Frakes and R. Baeza–Yates, Information Retrieval: Data Structures and Algorithms, Prentice Hall, 1992, pp. 106–109, 113–116, 138–142.

B. W. Kernighan and D. M. Ritchie, The C. Programming Language, 2nd Edition, PTR Prentice Hall, Englewood Clifs, New Jersey. 1988, pp. 152–153, 249–250.

"NameFinder; Software that finds Names in Text" by Phil Hayes, pp. 762–774 from RIAO 94, Conference Proceedings, Intelligent Multimedia Information Retrieval Systems and Management, Rockefeller Univ. New York, NY, vol. 1.

*Primary Examiner*—Paul R. Lintz
*Assistant Examiner*—Ella Colbert
*Attorney, Agent, or Firm*—Louis J. Percello

[57] ABSTRACT

Occurrences of proper names in text are identified by scanning one or more documents in a database of a computer system to identify one or more sequences of capitalized words and other specially defined words that appear in the documents as raw names. Each of the raw names has zero or more proper names, zero or more medial substrings, zero or more leading substrings, and zero or more trailing substrings. The raw names of one or more documents are "cleaned" and "split" until certain "cleaning and splitting conditions" are no longer met to obtain a list of clean and split candidate names.

16 Claims, 29 Drawing Sheets

NAME DATASTRUCTURE (325) WITH EQUIVALENCE LINKS

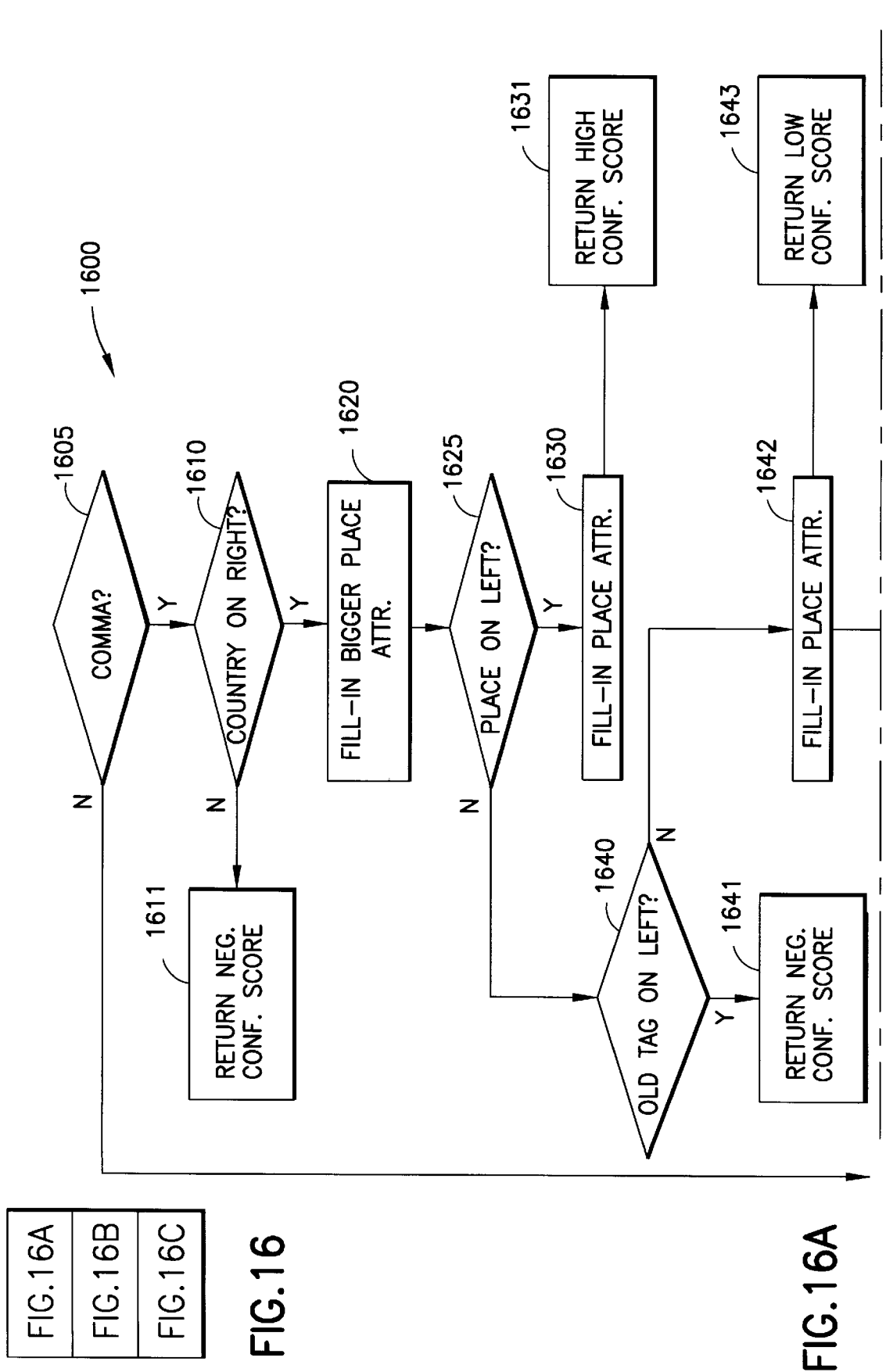

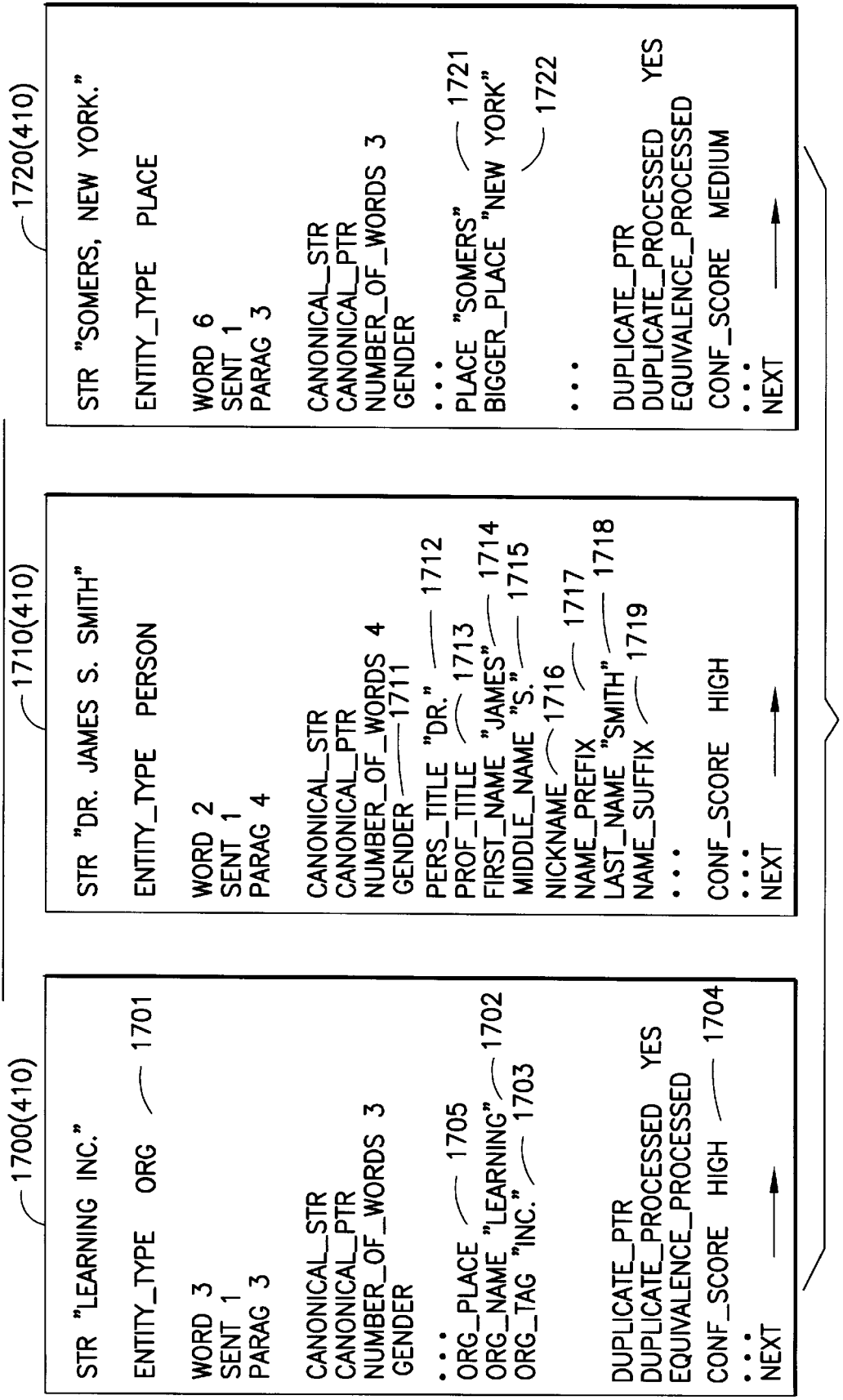

LOCAL EDUCATION OUTREACH PROGRAM >>ORG : LOCAL EDUCATION OUTREACH
IBM THOMAS J. WATSON RESEARCH CENTER >>ORG : IBM
NATIONAL GOVERNORS ASSOCIATION >>ORG : NATIONAL GOVERNORS ASSOCIATION
PRESIDENT CLINTON >>PERSON : PRESIDENT CLINTON
LEARNING >>ORG : LEARNING INC.
JAMES S. SMITH >>PERSON : DR. JAMES S. SMITH
IBM THOMAS J. WATSON RESEARCH CENTER >>ORG : IBM THOMAS J. WATSON RESEARCH CENTER
LOCAL EDUCATION OUTREACH PROGRAM >>ORG : LOCAL EDUCATION OUTREACH PROGRAM
NEW YORK CITY >>PLACE : NEW YORK CITY
JAMES S. SMITH >>PERSON : SMITH
NATIONAL SCIENCE AND TECHNOLOGY WEEK >>ORG : NATIONAL SCIENCE AND TECHNOLOGY WEEK
NATIONAL SCIENCE AND TECHNOLOGY WEEK >>ORG : NSTW
NATIONAL SCIENCE FOUNDATION >>ORG : NATIONAL SCIENCE FOUNDATION
SOMERS , NEW YORK >>PLACE? : SOMERS , NEW YORK
WESTCHESTER COUNTY >>PLACE : WESTCHESTER COUNTY

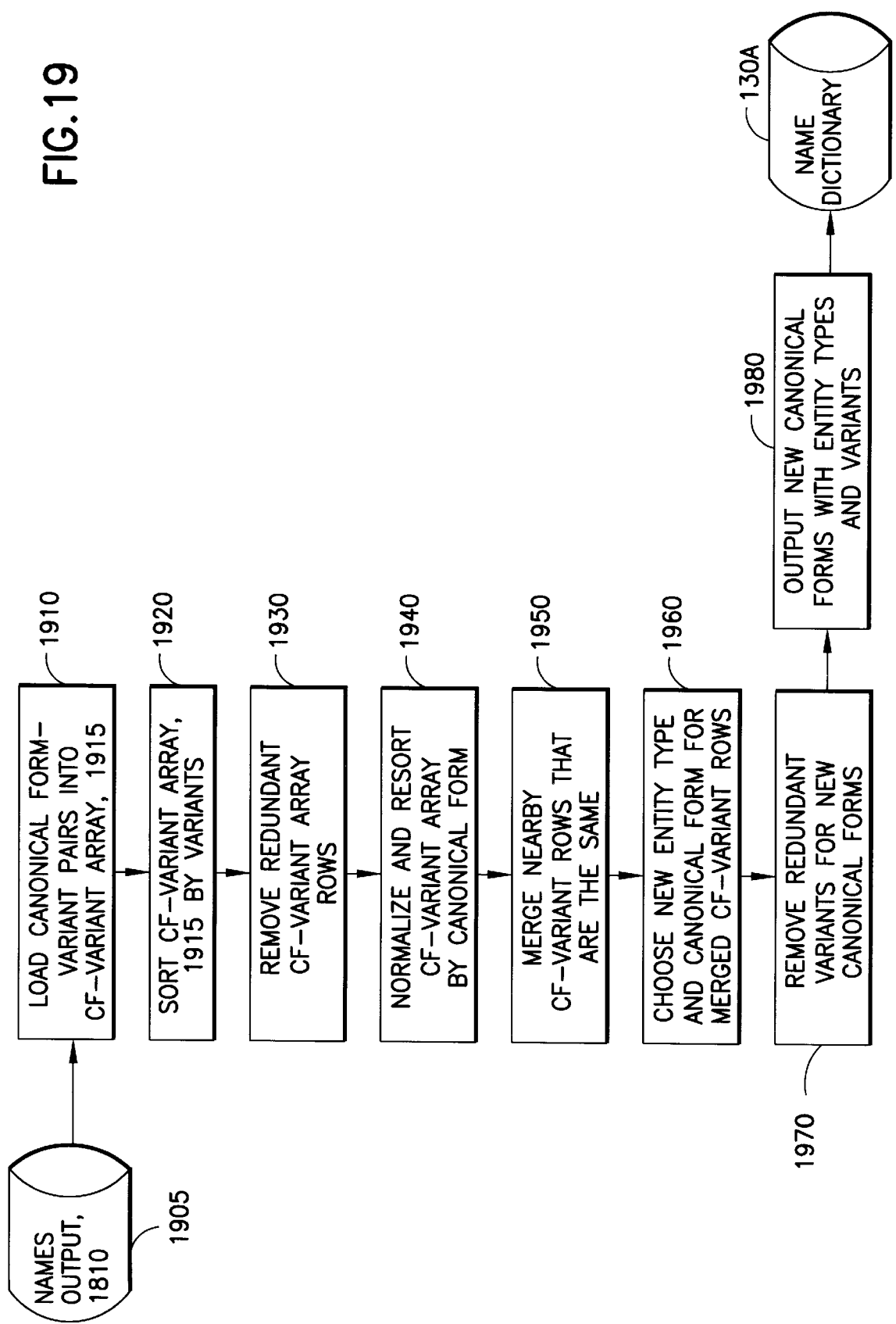

```
    ┌─────────────────────────────────────────────────────────────────┐
    │                                                            130  │
    │       2010                                                  /   │
    │         /                                                       │
    │  ORG     2  | IBM THOMAS J. WATSON RESEARCH CENTER |  | IBM  |  │
    │                                                  o              │
    │                                                  o              │
    │                                                  o              │
    │  PERSON  3  | JAMES S. SMITH |  | DR. JAMES S. SMITH | | SMITH| │
    │  ORG     2  | LEARNING |  | LEARNING INC. |                     │
    │  ORG     2  | NATIONAL SCIENCE AND TECHNOLOGY WEEK |  | NSTW |  │
    │  PLACE   1  | NEW YORK CITY |                                   │
    │                                                  o              │
    │                                                  o              │
    │                                                  o              │
    │                                                                 │
    └─────────────────────────────────────────────────────────────────┘
```

FIG.20

PROCESSING NAMES IN A TEXT

FIELD OF THE INVENTION

This invention relates to the field of text processing and information retrieval. More specifically, the invention relates to an improved system and method for identifying occurrences of proper names in natural language text.

BACKGROUND OF THE INVENTION

Text processing applications, such as machine translation systems, information retrieval systems or natural-language understanding systems, need to identify multi-word expressions that refer to proper names of people, organizations, places, laws and other entities, in order to process them correctly. When encountering "Mrs. Candy Hill" in the input text, for example, a machine translation system should not attempt to look up the translation of "candy" and "hill", but should translate "Mrs." to the appropriate personal title in the target language and preserve the rest of the name intact. Similarly, an information retrieval system which processes "Mrs. Candy Hill" as a query string should not attempt to expand it to all of its morphological variants ("candied", "candies", etc.); nor should it suggest synonyms (e.g., "sweets") for the name.

Because of this need to address the special properties of proper names, there has been a lot of recent research and development in this area. A variety of software programs are available which identify proper names in text. They differ in their coverage, accuracy, and functionality.

U.S. Pat. No. 5,287,278 describes a method for extracting company names from text. The algorithm described identifies company name suffixes, such as "Inc." or "Corp.", and attempts to locate the beginning of the name to the left of the suffix. When a name has been identified, the method generates variants of this name. The name identified and the variants generated can be stored in a database for future name identification.

Identifying the beginning and ending of proper names is complicated by the presence of conjunctions and prepositions, which may be part of the name, as in "Better Homes and Gardens lnc." or "Audi of America Inc.", but may also link two or more independent names, as in "IBM and Apple Computers". The algorithm described in U.S. Pat. No. 5,287,278 addresses the ambiguity of one conjunction ("and") and one preposition ("of") in two main ways: 1) the presence of certain words preceding "and" or "of" indicates that the name starts after them; e.g., in " . . . Division of <name>", "Division" indicates that the company name begins after "of"; 2) the presence of certain syntactic constructions in the immediate context. For example, a plural verb following "<name>, <name>and <name>" indicates that there are 3 names in the string analyzed.

An important aspect in name identification is the many-to-many mapping between entities and names. On one hand, several entities may be referred to by the same name ("Smith" for all people whose last name is "Smith"; "IRA" for both the Irish Republican Army and the Individual Retirement Account); on the other, several names may refer to one entity ("President Clinton", "Bill Clinton", "William Clinton"). Perfect mapping of names to entities is not feasible with state-of-the-art software, and different prior art have different partial solutions.

Some prior art identifies names in text and their variants based on a database of known names. The different variants may be explicitly listed in the database, or they may be recognized if they differ slightly and predictably from the listed name. NameFinder of Carnegie Group, for example, will find predictable variations of the listed names, such as "CGI" or "Carnegie Group" for "Carnegie Group Incorporated" wherever they occur in the text.

Other prior art links variants within the same document. SRA's NameTag, for example, links a mention of "Barbara" in a document with "Barbara Bush" in the same document.

STATEMENT OF PROBLEMS WITH THE PRIOR ART

One problem with some of the prior art (NameFinder) is the requirement for a pre-existing database of names. Creating a database of names is a very laborious task and requires constant human maintenance, as new names are created when new companies are formed, small places become topical, or entities cease to exist.

U.S. Pat. No. 5,287,278 cited above describes an algorithm for identifying company names in text without a pre-existing database. It is not clear, however, how the same techniques can be applied to names that do not end in a suffix, such as place names, or organization names ("The White House", "The Museum of Natural History", etc.).

Another problem with the prior art is the handling of name ambiguity, in particular, whether a certain string contains one or more names. U.S. Pat. No. 5,287,278 cites some heuristics for deciding whether "and" and "of" are part of a company name or whether they are used to link two independent names. The disadvantage of these heuristics is that they are simplistic and may often fail to give correct results, especially when more prepositions ("at", "in", "for", "de" etc.) that occur in names of people and organizations are included. For example, one heuristic cited, that of looking for the presence of a certain string, such as "division" immediately to the left of "of" would yield wrong results for names like "BMY Division of Harsco" or "Division of Consumer Services", which should not be split. Another mentions the presence of a plural verb, such as "are" as in "IBM and Apple are . . . " that would indicate that there is more than one entity involved. However, many times the needed syntactic clue is missing, as when the verb is in the past ("concluded", for example) so it's not clear if its the verb is singular or plural.

A third problem with prior art is the name-to-entity mapping when such mapping is ambiguous because of the many-to-many relations between names and entities. Optimal name identification would determine the entity referred to for each particular occurrence of a variant in the text. It would thus link as equivalent all the different variants that refer to the same entity and would differentiate all the same variants that refer to different entities. It seems that the prior art fails to do either the former or the latter.

Some prior art always links a name to all of the entities it can be used to refer to. NameFinder, for example, will identify "IRA" as a name but would fail to determine whether it refers to the Irish organization or to the Retirement Account. Other prior art will fail to link all mentions of a name to the entity it is used to refer to. Thus, SRA's NameTag, for example, does not link mentions of "Md" as a place and mentions of "Maryland" as a place, as mentions of the same entity.

OBJECTS OF THE INVENTION

An object of this invention is an improved system and method for identifying occurrences of proper names in natural language text.

SUMMARY OF THE INVENTION

The present invention is a system and method for identifying one or more proper names that appear in one or more documents in a database of a computer system. First the documents are tokenized and scanned, to select one or more raw names. Each of the raw names has zero or more proper names, zero or more medial substrings, zero or more leading substrings, and zero or more trailing substrings. In a preferred embodiment, the raw names are processed and stored as a value, preferably as "str" attribute values of name elements. Name elements are placed on a data record, preferably a linked list, called the "list of candidate name elements". In addition to the str attributes, the name elements have other attributes which either contain a value or else have a null value.

The raw names of the candidate name elements are "cleaned" and/or "split" dynamically (the names and the name elements are changed by various processes) to produce a final list of candidate name elements. If the raw names meet a "cleaning condition", i.e. the raw names have one or more of the leading and trailing substrings, the raw names are "cleaned" by removing the leading and trailing substrings to create a new str value for an existing name element. If one or more of the medial substrings exists, a "splitting condition" is met and the raw name is split at the medial substring to create two split str values. The medial substring is removed. The name element currently being processed acquires one of the str values as its new str value. A new name element is formed, and it acquires the other str value.

The split candidate names are cleaned and split again and again until no more splitting conditions remain. This process is repeated for an entire document to obtain a list of cleaned and split names. An optional "duplicate recognition processor" establishes links among name elements on the list of candidate name elements whose str values are duplicates. The name elements on the list of candidate name elements that have been cleaned, split, and or linked, are called candidate name elements and no longer need to be changed by further processing.

There are alternative preferred cleaning and splitting conditions.

The str values of candidate name elements on the list of candidate name elements are then compared to strings in a database of names, called a name dictionary, and/or to query elements of a query in order to determine if there are matches between any of the names in the name dictionary (query elements) and any of the str values of the candidate name elements.

BRIEF DESCRIPTION OF THE DRAWINGS

The foregoing and other objects, aspects and advantages will be better understood from the following detailed description of preferred embodiments of the invention with reference to the drawings that include the following:

FIG. 8 is a flow chart of the steps performed by a name splitting processor called by the document scanning processor.

FIG. 14 is a flow chart of the steps performed by a person entity-type process used by the equivalence processor.

FIG. 15 is a key to a flow chart of the steps performed by an organization entity-type process used by the equivalence processor.

FIG. 16 is a key to a flow chart of the steps performed by a place entity-type process used by the equivalence processor. Figure 16A, 16B, and 16C are the actual flow chart.

FIG. 17 is a block diagram of the name elements on the name data structure with attributes filled by the entity-type processes.

FIG. 18 is a drawing of one preferred output.

FIG. 19 is a flow chart of the steps performed by a name aggregator.

FIG. 20 is a drawing of an alternative output.

DETAILED DESCRIPTION OF THE INVENTION

Figure 1:
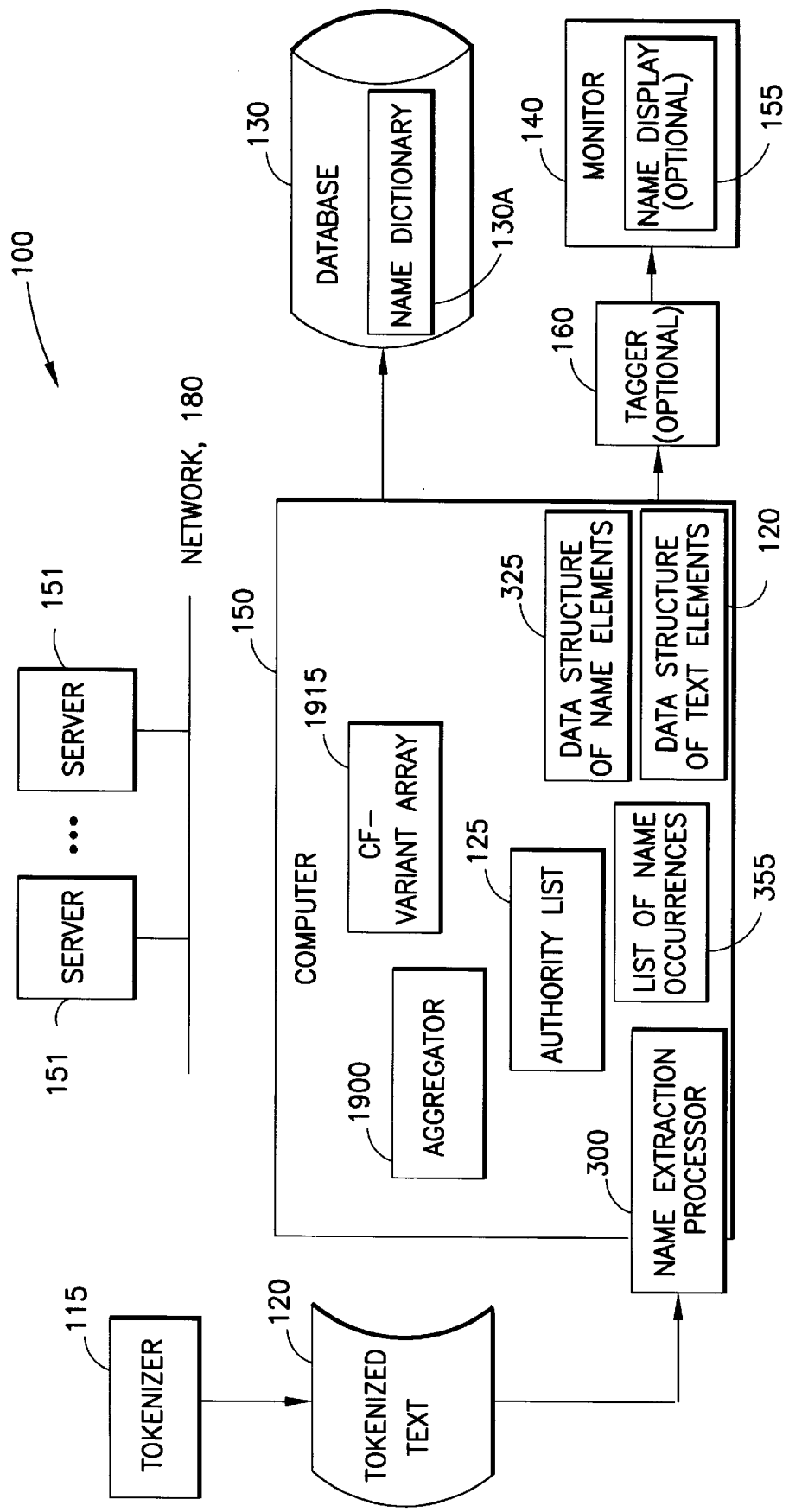
FIG. 1 is a block diagram of a preferred embodiment of the present system.

FIG. 1 is a block diagram of one preferred system embodying the present invention. The system 100 comprises any general purpose computer (or computer system) with a computer CPU/memory 150, a computer data base 130 used for a name dictionary 130A. An optional display monitor 140, is connected to the computer CPU/memory 150. One non-limiting preferred system 100 is an IBM RISC/6000 AIX machine with a monitor 140 capable of displaying text. An alternative preferred embodiment 100 is a collection of computers 150 organized in a general purpose client 150/server 151 architecture. One non limiting example of this uses the internet or other local area or wide area network 180. See for example, U.S. Pat. No. 5,371,852 to Attanasio et al. issued on Dec. 6, 1994 which is herein incorporated by reference in its entirety. The system 100 can comprise one or more databases 130.

A tokenizing process, 115, generally known in the art, takes running text as input, in the form of a string of characters, and analyzes it into a list of tokens, called the tokenized text, 120 (described below). Following is a sample of running text, which serves as input to process 115:

<DOC>

Local Education Outreach

At IBM, they take seriously the responsibility to help schools achieve the goal articulated by President Clinton and the National Governors Association that . . .

Together with Learning Inc. of Somers, N.Y., IBM is starting . . .

At the IBM Thomas J. Watson Research Center in Westchester County, Dr. James J. Smith manages the Local Education Outreach Program, and organizes activities for students and teachers from school districts in the area, including New York City. Smith also co-ordinates IBM's participation in the National Science and Technology Week. NSTW is an annual event sponsored by The National Science Foundation to foster public understanding of science and technology.

</DOC>

The system 100 executes a name extraction process 300 (described below) that extracts proper names from the tokenized text 120 and produces a data structure 325, of name elements. In addition, process 300 produces a name dictionary 130 corresponding to the tokenized text 120. Process 300 also produces a list 355 of all the occurrences of proper names with their position in the tokenized text 120. The contents of the name occurrence list 355 can be optionally displayed as a name display 155 on the monitor 140. An alternative name display 155 is comprised of the tokenized text 120 with tags around each of its proper name occurrences, as produced by a tagger 160, generally known in the art.

As part of its execution, processor 300 consults an authority list 125. An authority list 125 is a list of terms that are used by the invention as described below. Non limiting examples of terms on the authority list 125 include: personal titles, such as "Mr." or "Dr."; professional titles, such as "Assistant" or "Professor"; name suffixes, such as "Jr." and "Sr."; major countries and states in the United States; place indicators, such as "Lake", "Mt." or "City"; organization end-tags, such as "Inc." and "Co."; organization indicators, such as "Museum", "Hospital", or "Institute". In addition, other special words are listed, such as national or ethnic adjectives ("American" or "Moslem"). Other special words include "non proper name words" like those that often occur at the beginning of sentences but are not likely to be part of names ("Yesterday" or "Only"); or dates (such as "December" or "Monday"); etc. Other examples of terms that are used in the authority list 125 are given below.

Figure 2:
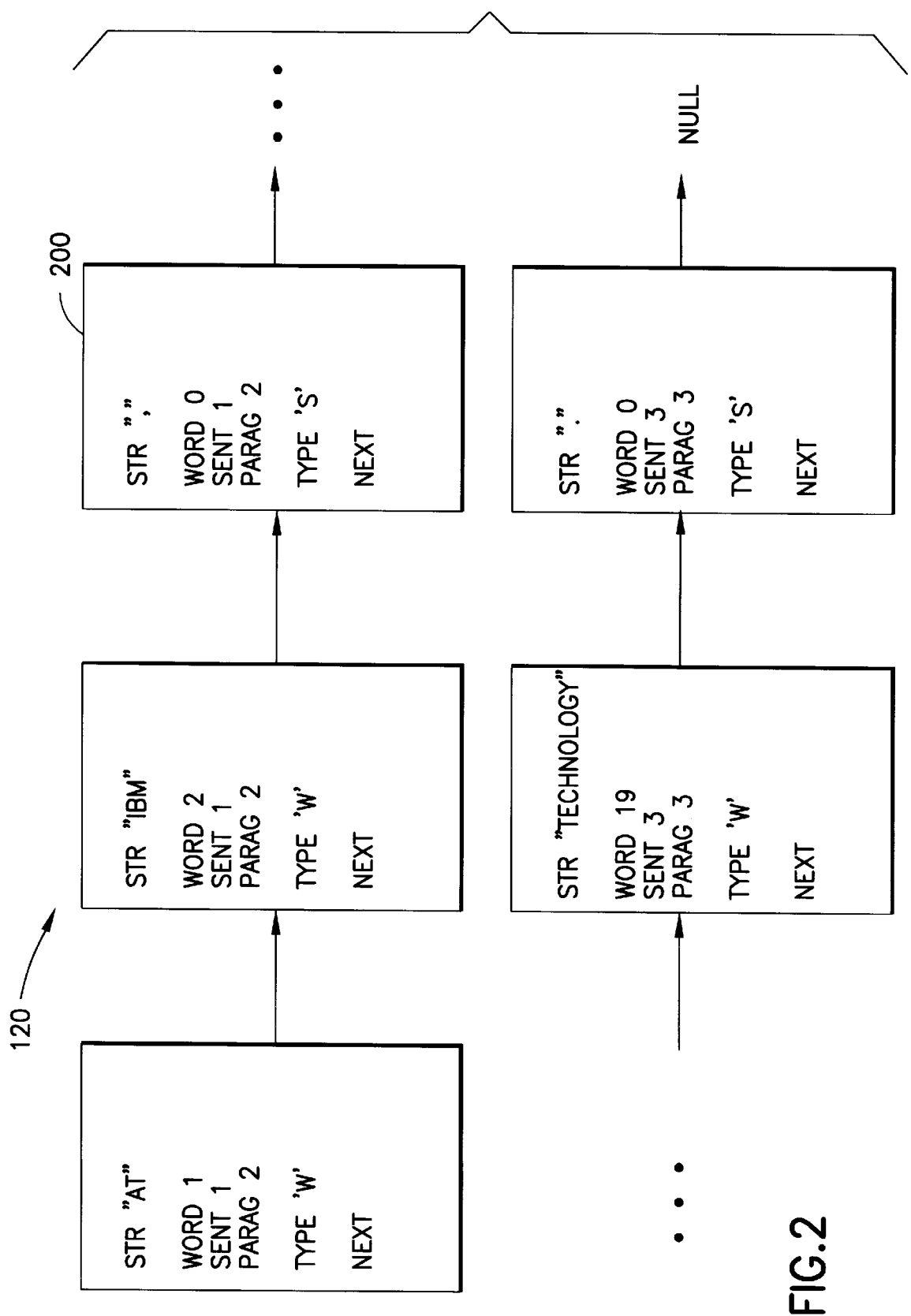
FIG. 2 is a drawing of a tokenized text of a document upon which the present system operates.

FIG. 2 shows the tokenized text 120 as a data structure representing the elements of one whole text, or document. If a text file contains multiple documents and the documents are separated by an identifiable document-separation indicator, then 120 is the tokenized content of a single document of that file. Each element or token 200 in the data structure 120 includes one or more attributes and their values.

A "token" 200 is typically a string of characters in a document. Non limiting examples of these strings include words, punctuation, tags and markers, etc. "Attributes" are data fields in the token data structure 200 that describe the token 200. Examples of attributes include location of the token 200 within a document, proximity of the token 200 with other tokens 200, and type of token 200. "Values" of attributes are second paragraph of the document (location), pointer to the next token 200, word (type), etc.

One preferred embodiment of a token 200 is shown in FIG. 2. The "str" attribute indicates the content of the string. The word, sentence and paragraph attributes indicate the position of this token in the text. (In FIG. 2, the sentence and paragraph attributes are designated as "sent" and "parag", respectively.) The type attribute indicates whether this token is a regular word (type 'w'), a special character (such as punctuation, type 's'), a tag (such as an html or sgml tag, type 't'), a possessive marker (such as "'s", type 'p'), etc. The type analysis can be expanded to include dates, monetary values, components of compound or hyphenated words, and others.

Figure 3:
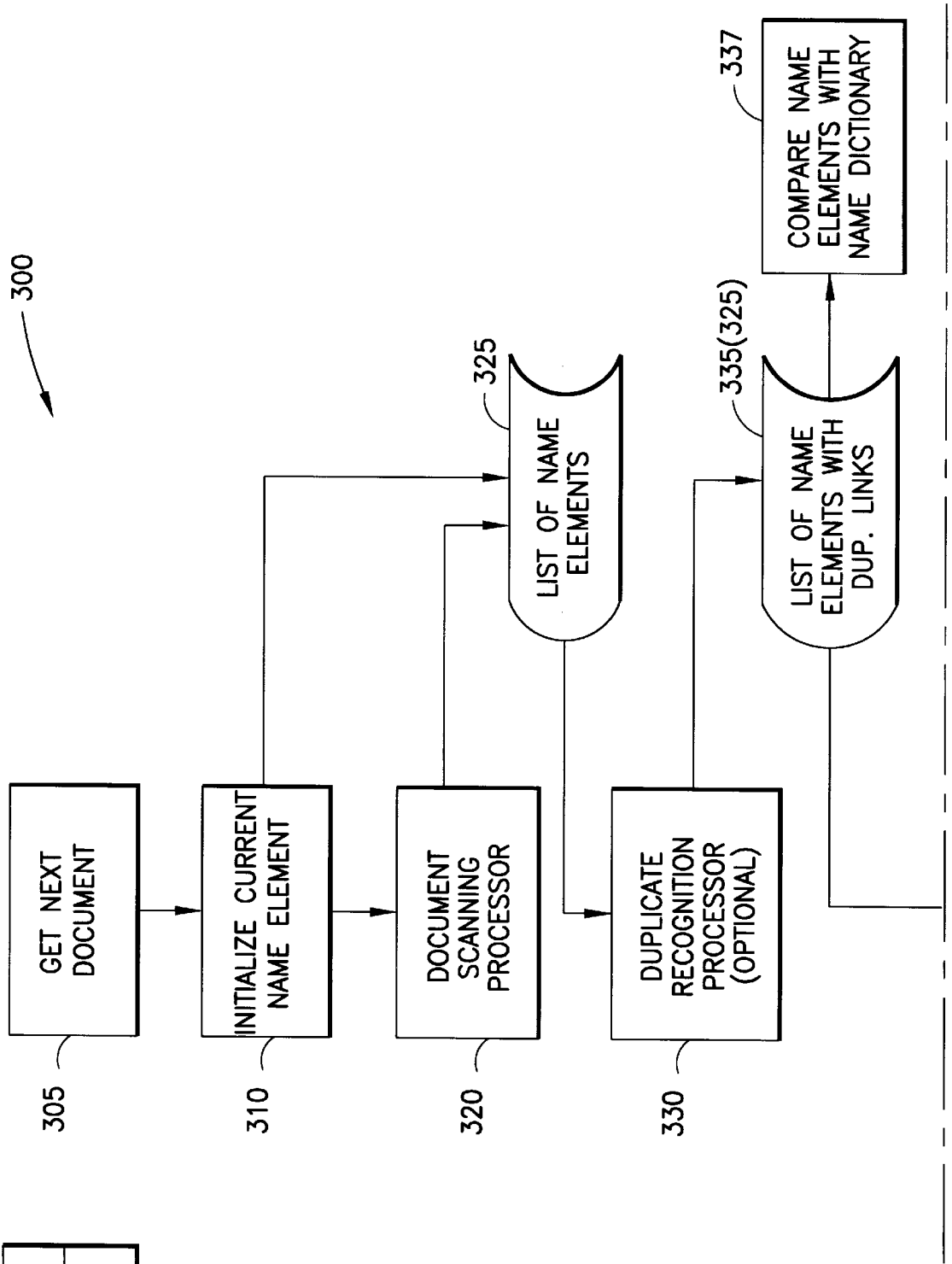
FIG. 3 is a key to a flow chart of the steps performed by a name extraction processor.
Figure 3B:
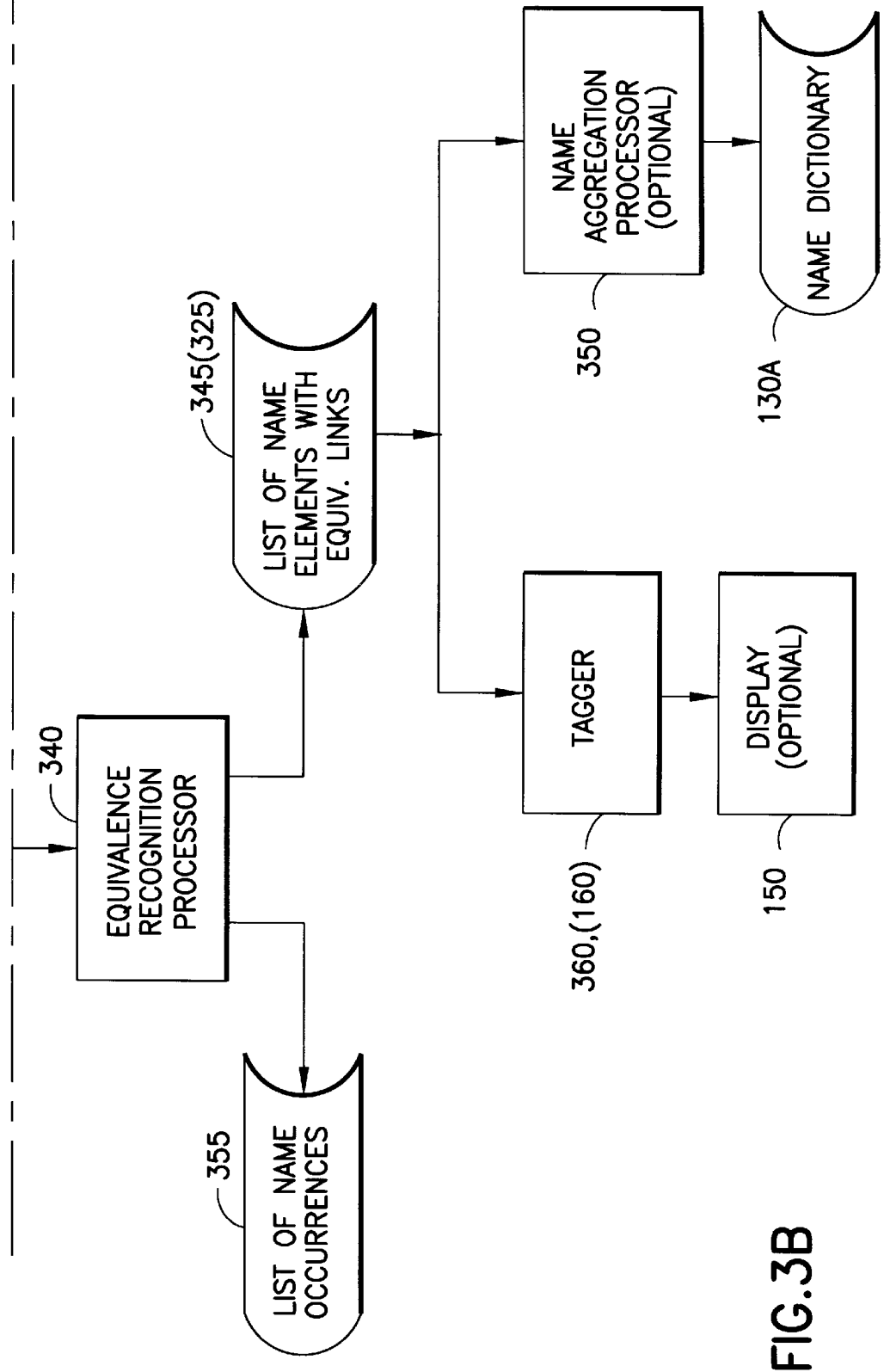

FIG. 3 describes the overall flow of the name extraction processor 300. The name extraction processor 300 creates a data structure, more specifically, a linked list, of name elements. Each name element is also a data structure, consisting of attributes and their values. The value of the "str" attribute is formed by processing tokens 200 of one or more documents and concatenating the "str" value of selected tokens 200. After the initial concatenation, the "str" attribute of a name element on list 325 contains a "raw" name. The raw names of the name elements on the list 325 are then cleaned and/or split, to update the "str" values for existing name elements and to create new name elements with new "str" values. The updated and new name elements are called "candidate name elements". The str values of the candidate name elements on this list then can be compared with other names/query elements. Links indicating duplicate name elements (with identical or near identical "str" values) are optionally added among the name elements on the list (325, 335).

The list of name elements (325, 335) can be further processed with an equivalence recognition processor 340 to add equivalent links 345 (325, 335) among the name elements on the list. See below for the definition of "equivalence." Canonical forms for the name elements on the list 345 are optionally created at the same time. Canonical forms from different documents are optionally merged together by a name aggregation process 350. These merged canonical forms can be used to produce a name dictionary 130A.

In step 305, processor 300 obtains the next tokenized document 120 as input. In step 310, it initializes the first name element and places it on the data structure 325. When a name element is initialized, all the values of all its attributes are null. As processor 300 executes, different values are defined for various attributes. Processor 300 calls the document scanning processor 320, which adds more name elements to the data structure 325, and fills in their str, word, sentence and paragraph attributes, as well as the "number-of-words" attribute for each name element. List 325 may contain duplicate name elements, that is, name elements with identical or near-identical str values, if a name was repeated in the document 120. The duplicate recognition processor 330 operates on list 325 to recognize name elements with identical str values and link them to each other, producing a new version of 325, which is list 335.

To determine whether the str values of the name elements on the list are valid names and to identify what entities they refer to, the str values can be compared to names stored in a name dictionary (step 337). For example, the str "IBM" (see 415A in FIG. 4) matches "IBM" in the name dictionary 130 (see line 2010 in FIG. 20). Line 2010 in the name dictionary provides the information that "IBM" is the name of an organization. This technique of comparing names to a database or dictionary of existing names is known art, as used by Carnegie Group's NameFinder.

The optional equivalence recognition processor 340 operates on list 325 to recognize non-duplicate names that refer to the same entity and are therefore identified as equivalent.

A canonical form is defined for a group of equivalents (see definition below), an entity type is assigned to it, and links are established among all the equivalents, producing a new version of list 325, which is list 345. In addition, in one preferred embodiment, processor 340 produces a list of all names occurrences 355 which comprise the following triples:

---
the str value of a name element in 345;
the canonical form of the name
  element in 345;
its location in 120, expressed in word, sentence and
  paragraph attributes.

---

Optionally, the name occurrences 355 can be displayed as display 155. Display 155 can comprise list 355, sorted in occurrence order, alphabetical order, or any other order. Display 155 can also be tagged 360 by the tagger 160, which operates on the data structure of the tokenized document 120 to introduce tags into it at name locations, as specified in list 355.

Optionally, a name aggregation processor 350 processes one or more list(s) 345, to aggregate their content into a name dictionary 130A.

Figure 4:
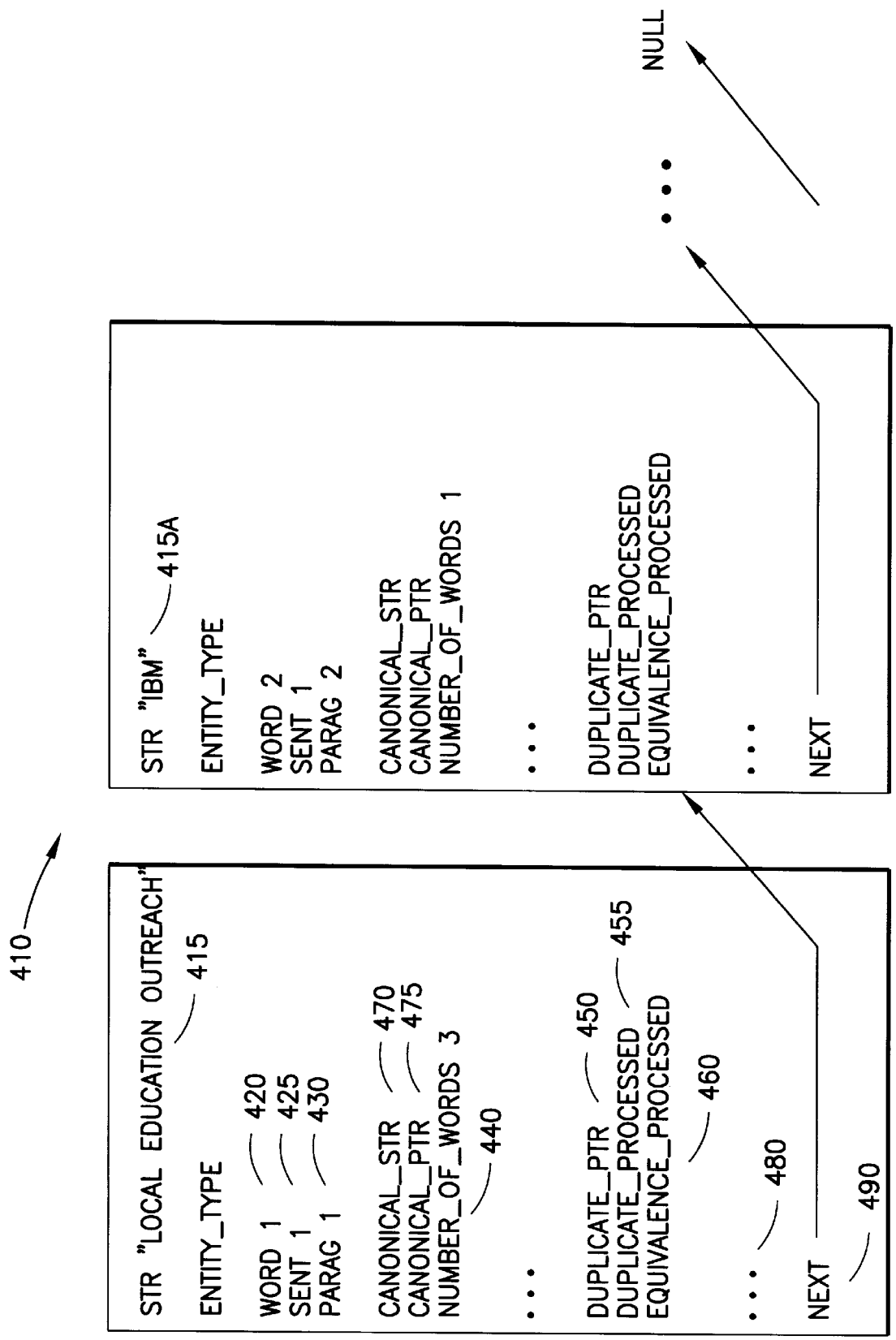
FIG. 4 is a block diagram of a name data structure containing name elements with attributes.

FIG. 4 shows an example of the data structure 325 of name elements. After the initialization step 310, this data structure, which is a linked list, consists of one element 410, whose attributes (identified by the numbers between 415 and 480 inclusive) are all null and whose "next" attribute 490 points to NULL. As part of document scanning processor 320's execution, the values of the str attribute 415, the word, sentence and paragraph attributes 420–430, respectively, and the number-of-words attribute 440 are set. When a new name initialization takes place, the value of the "next" attribute points to the new 410 name element on the linked list.

Alternative name data structures (325, 335, 345, 355) that have one or more named elements 410, including a string attribute 415 and associated attributes (e.g. 420), are envisioned. For example, the name data structure (325, 335, 345, and 355) could be additional annotation on the tokenized text 120 or other records that include identification of the named element 410 with its string 415 and associated attributes.

Lists 335, 345, and 355 are different instantiations of list 325. Each instantiation includes more information in the attributes and more links among the elements of the list. For example, the initial list of name elements 325 has values in attributes str 415, word 420, sentence 425 and paragraph number and number-of-words 440. "Number-of-words" records how many tokens of type 'w' (i.e., how many words) exist in "str".

After the duplicate recognition process 330 is complete, the list of names 335 has duplicate links 450 among name elements whose str values are identical or almost identical. After the equivalence recognition process 340 is complete, the list of name elements 345 has equivalence links 450 among elements that refer to the same entity. In addition, these elements have values for the attributes of first name, middle name, last name, etc., if they refer to a person. There are values for the attributes of organization name, organization location and organization tag, if they refer to an organization; etc. After the equivalence recognition process, all elements of list 345 either have a value for their canonical form attribute or else point to an anchor which has one. After the name aggregation process 340 350 is complete, all variants and anchors that have identical or near identical canonical forms (from different documents) are grouped together.

Figure 5:
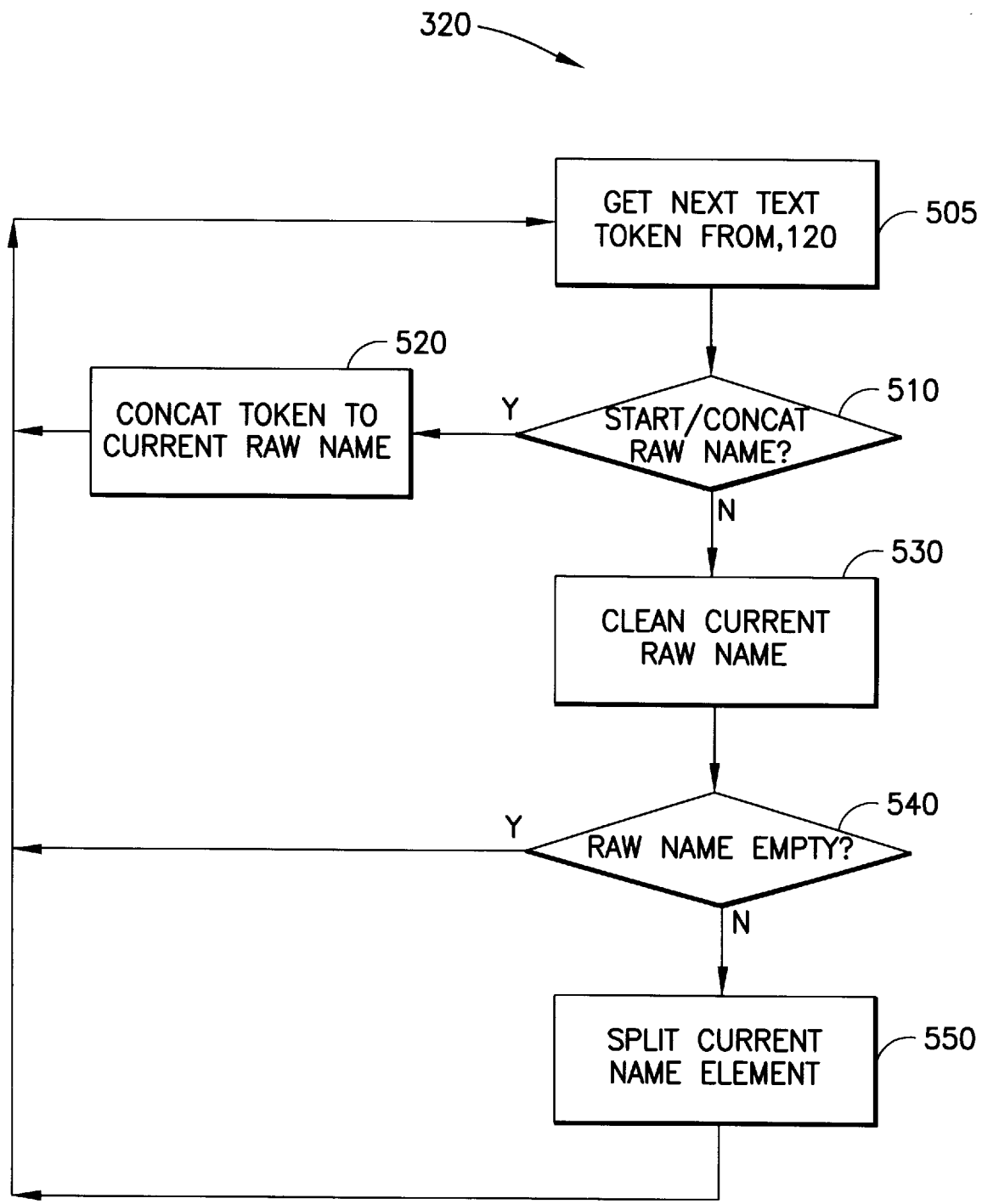
FIG. 5 is a flow chart of the steps performed by a document scanning processor.

In FIG. 5, the scanning process 320 is described. The first part of the process 320 (steps 505, 510, and 520) creates raw names by concatenating selected tokens 200 from the tokenized text 120. The second part of the process 320 (steps 530, 540, and 550) cleans and/or splits the raw names to update the str values of existing name elements or to create new name elements. The resulting modified list 325 contains candidate name elements. The process 320 scans and concatenates the elements (tokens 200) of the tokenized document 120 as follows: first it gets the next token from 120 (step 505); then it determines whether the string of this token (stored as the str value) is acceptable for starting a raw name (when the str value of the current name element is empty) or for continuing a raw name by concatenating to it (if the str value of the current name element is not empty) (step 510).

There are many ways to determine whether or not a token 200 is or is not acceptable for being part of a raw name, i.e., whether it is selected for starting or concatenating to a raw name 510. With few exceptions, a capitalized token is acceptable as a part of a raw name and a non-capitalized (all lower case) token is not. Some non limiting examples of these selection criteria are given below.

A token string 200 is acceptable if it is capitalized but is not explicitly listed in the authority file 125 (also called authority list 125) as a non-name. Capitalized non-names, that are listed are unambiguous date words (e.g. "January") or special acronyms (e.g. "TV").

A token string 200 is also acceptable if it is one of a selected group of uncapitalized strings (e.g. "van"), (explicitly listed in the authority file 125); or if it is a numeral or an ordinal number. Furthermore, if it is a numeral, it is acceptable only if the current name's str does NOT end in a preposition, a comma, a date or another number.

Since, according to a stylistic convention of the English language, all the first letters of words in headlines and other headings are often capitalized, the presence of capital letters in such headings is not necessarily an indication of names of people, places or organizations. Tokens 200 occurring after a begin-heading tag and before an end-heading tag, if such tags exist, are not acceptable as names and their strings do not concatenate.

A sentence-initial token is also usually capitalized and so it is not acceptable if it's more than 4 characters long, ends in "ly", and is not a person's first name (e.g. "Frequently", but not "Beverly"). In addition it is not acceptable if it's one of about 400 frequent sentence-initial words listed in authority list 125 as non names (e.g. "Yesterday"). The frequent sentence-initial words listed in the authority list 125 are non names that have a high statistical probability of being at the beginning of a sentence. This list can be developed by analyzing random samples of text.

If the token 200 is acceptable for concatenating to the current name's str, it is concatenated to it in step 520. If it is a sentence-initial token, it is marked as such and reexamined later (see below). If this is the first token 200 of the raw name the word, sentence and paragraph attributes values of the current token 200 are copied as the values of the word, sentence and paragraph attributes of the current name element.

In addition, the number-of-words value of the current name element is incremented by one (see 440 in FIG. 4).

If a next token 200 is not acceptable for concatenation, then the scanning processor 320 signals the end of concatenation of tokens. The current string of concatenated tokens is now called a "raw name". An example of a raw name 415 (concatenated string of tokens 200) is shown in data structure 410 as "Local Education Outreach." Each of the raw names 415 have zero or more proper names, zero or more medial substrings, zero or more leading substrings, and zero or more trailing substrings.

The remaining steps in process 320 either clean a raw name and update the str value of its name element on list 325; or split a raw name into several parts and create new name elements on list 325 to hold the new parts in their str values. In step 530, the raw name is cleaned (see the name cleaning processor 600 below). If as the result of the cleaning process, the entire raw name was removed, so that the str of the current name element becomes empty (540) the current name element is replaced by the next name element and its attributes are filled with new values. The scanning processor resumes the loop in step 505 by getting the next token 200 from the tokenized document 120.

If the str of the current name element is not empty (in step 540) as a result of cleaning, it may contain several names concatenated together (e.g. "France and Spain"). The raw name is therefore processed by the splitting processor 550 (see below) into its parts. After the splitting of the raw name, the scanning process resumes at step 505.

Figure 6:
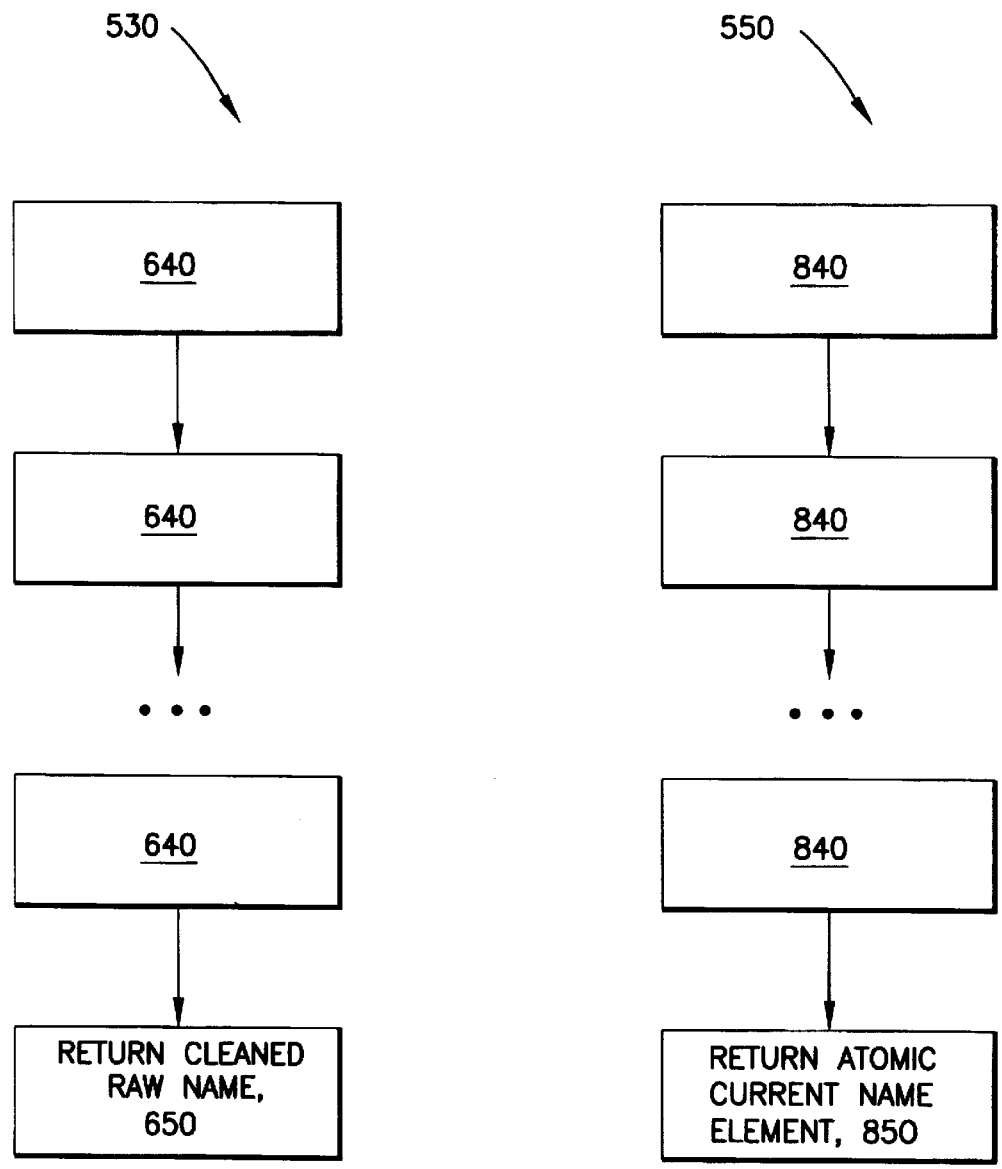
FIG. 6 is a flow chart of the steps performed by a name cleaning processor called by the document scanning processor.

FIG. 6 describes the name cleaning processor 530. The processor involves processing the raw name 415 through several condition-and-execution blocks, 640, in order. If the conditions of any of the blocks 640 are met, the raw name is modified in that block, by the removal of substrings from the beginning and/or the end of the raw name. The current name element's number-of-words value is decremented by the number of such substrings removed from the raw name. The modified raw name is examined by the next 640 block. At the end of the process 530, the cleaned name element is returned (step 650).

Figure 7:
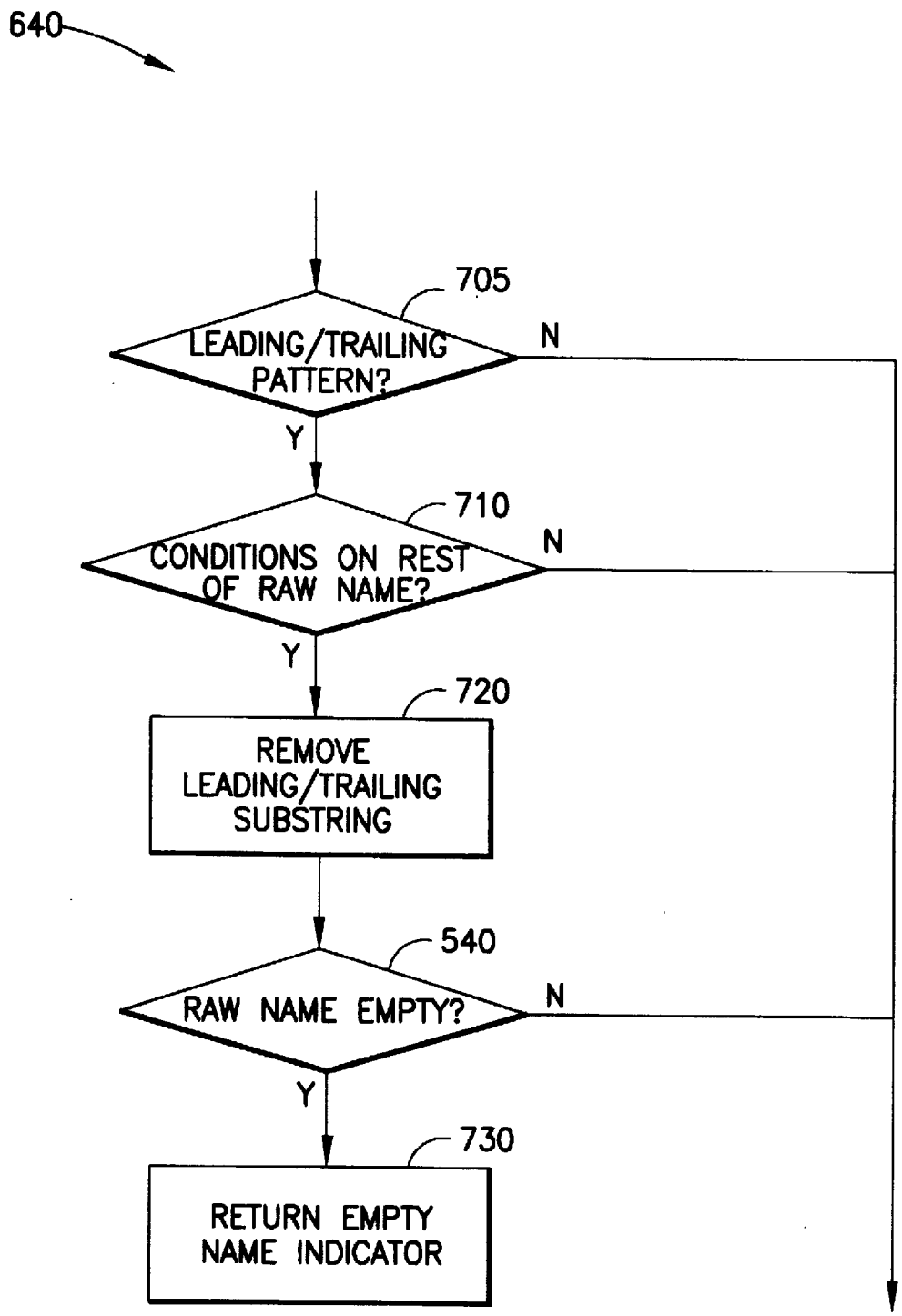
FIG. 7 is a flow chart of the substeps performed by a name cleaning processor.

FIG. 7 describes some examples of the details of a cleaning block 640. In step 705, the raw name is examined for certain leading and trailing substrings that may have been concatenated in step 520 but that can be removed now that the concatenation process has ended. If the leading or trailing strings conform to some pattern (e.g., they are all digits or punctuation), the raw name is examined further (710). If further conditions hold, an associated cleaning function 720 is performed. Otherwise, the raw name proceeds to the next cleaning block 640. If the conditions hold, the leading or trailing substrings are removed (step 720) by the associated cleaning function, and the number-of-words of the name element is decremented to reflect the number of tokens of type 'w' in the resulting cleaned raw name. Otherwise the raw name proceeds to the next cleaning block 640.

As a result of step 720, if the str is empty, the cleaning process 540 is terminated, and an indication that str is empty is returned in step 730, so that the name element can be replaced by the next name element 410. If str is not empty, it proceeds to the next cleaning block 640.

The various cleaning condition-and-execution blocks 640 cause certain cleaning functions 720 to be executed if certain other cleaning conditions 710 are met. The condition-and-execution blocks 640 may take the form of "execute a specific cleaning function if a cleaning condition is met." Non limiting examples of cleaning condition-and-execution blocks 640 include following:

1. Remove trailing space or punctuation marks, such as open parenthesis, comma, or quote, if such trailing spaces or punctuation marks exist.
2. Remove final "'s" if it follows certain words from the authority list 125, that would indicate that the raw name is a place name or an organization name (e.g. "France's" or "Inc.'s").
3. Remove final number (e.g. "France 1987") if it follows certain words from the authority list 125, that would indicate that the raw name is a place name or an organization name.
4. Remove a final "'s" if it follows a word that is all upper case (e.g. "IBM's").
5. Remove the last word of the raw name if it is an ambiguous date word (as determined by authority list 125), such as "June". Also, remove function words, ordinals or numerals, if they precede it (e.g. remove "on 2nd of April"). (Function words are typically closed-class words, such as prepositions—"of", "for"—and conjunctions—"and", "or".)
6. Remove a national adjective (e.g. "British") if it is the last word of the raw name. Also, remove function words or ordinals or numerals if they immediately precede it (e.g., remove "by British").
7. Remove any function word (as determined by list 125), such as "of", "for" or "and", if it is the last word of the raw name.
8. Remove a hyphen and a lower-case word if the hyphen and lower case word follow a capitalized word (e.g. "California-based").
9. Remove space or punctuation mark if it occurs as the first thing in the raw name.
10. Remove a word that can't constitute a name on its own if it is by itself, or if it is followed by a function word. These words are listed in authority list 125. For example, the raw name "Attorneys for IBM . . . " becomes "IBM . . . ", but "Attorneys Associated" remains intact.
11. Remove the whole raw name if it consists of a geographical modifier followed by a national adjective, e.g., "North American"; or if it is just a national adjective e.g., "African".
12. Remove any raw name if it consists only of lower-case characters, punctuation marks, spaces and numbers, e.g. "$123.40".

FIG. 8 represents the recursive name splitting processor 550, which takes as input a name element with a cleaned raw name (as its str value) and submits it to a series of splitting condition-and-execution blocks 840, in order. If a certain medial substring is found, the raw name is split into two parts preceding and following the medial substring, and the medial substring is removed.

A raw name that was formed by concatenating a sequence of mostly capitalized tokens and function words may be a complex construction that is a conjunction of several names (e.g. "IBM and Bell Laboratories"). Since a single name may contain the word "and" (e.g. "Victoria and Albert Museum"), special heuristics are needed to distinguish multi-name conjunctions from single names containing conjuncts.

Conjunction is a recursive process: there could be a conjunction of conjunctions, as in "The MOMA, the Museum of Natural History and the Victoria and Albert Museum". Therefore the splitting heuristics need to apply recursively, too.

Other complex name structures contain prepositions ("Reagan on Election Day"), and the possessive "'s"

("Britain's University of Sussex"). The conditions of the blocks 840 test for conjunctions, prepositions and possessives.

If the conditions of any of the blocks 840 are met, the cleaned raw name is split into a left part and a right part in this block 840 and each part of the raw name is submitted to processor 550 again. The recursion stops when none of the splitting conditions hold for a raw name. The raw name is then "atomic", i.e., can no longer be split. Every time a raw name is split, the str value of its name element is modified, to contain only the left part of the raw name. A new name element is formed and added to the name element list 325. The values of the new named element attributes are also filled (see below). In one preferred embodiment, the new named element's str value is the right part of the raw name after splitting.

The blocks 840 are ordered so that certain splitting conditions are identified before others. The blocks 840 are divided into the first group of splitting conditions for which the raw name to be split is scanned from right to left; followed by the second group of splitting conditions for which the raw name to be split is scanned from left to right.

Figure 9:
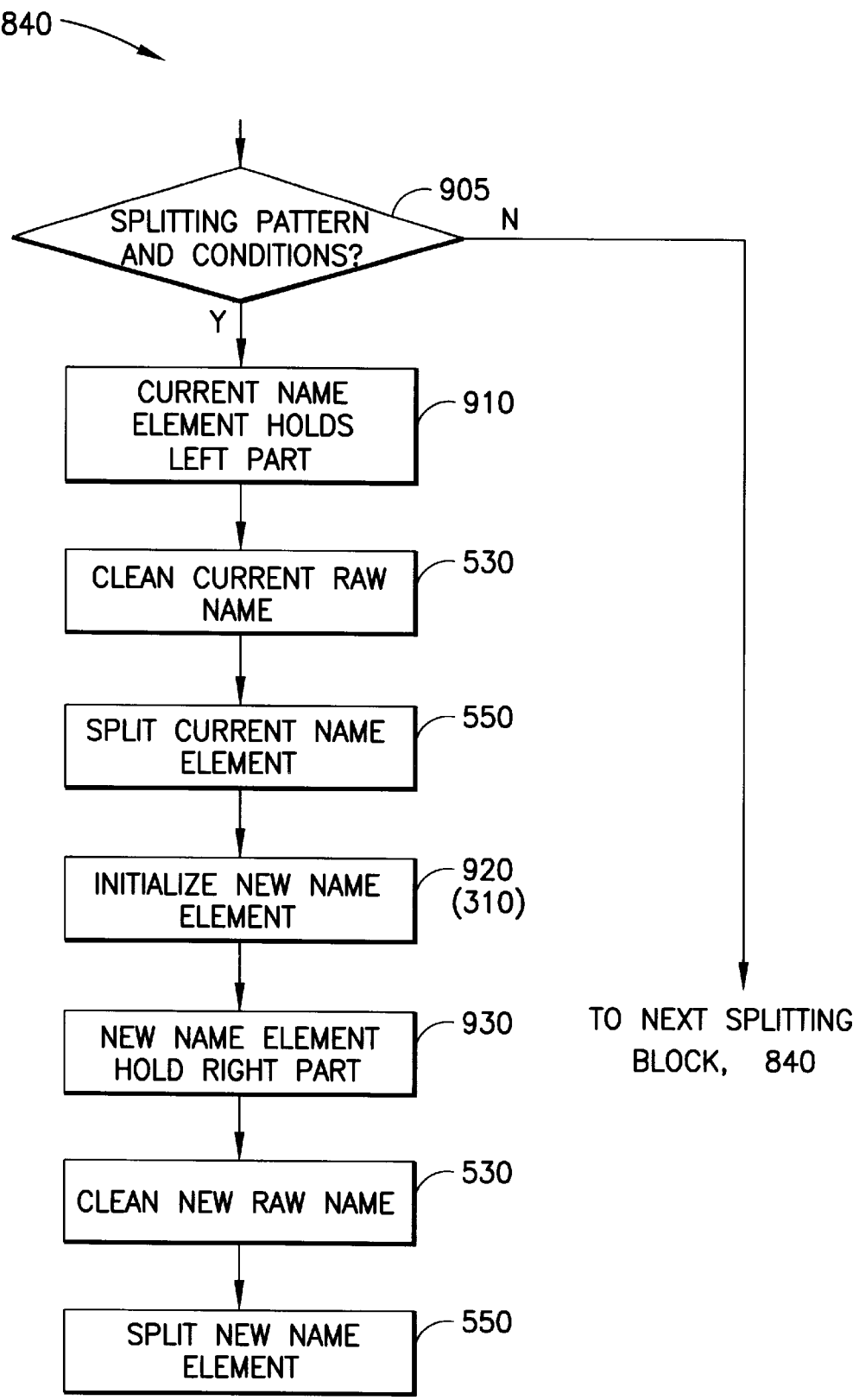
FIG. 9 is a flow chart of the substeps performed by a name splitting processor.
Figures 9A, 9B:
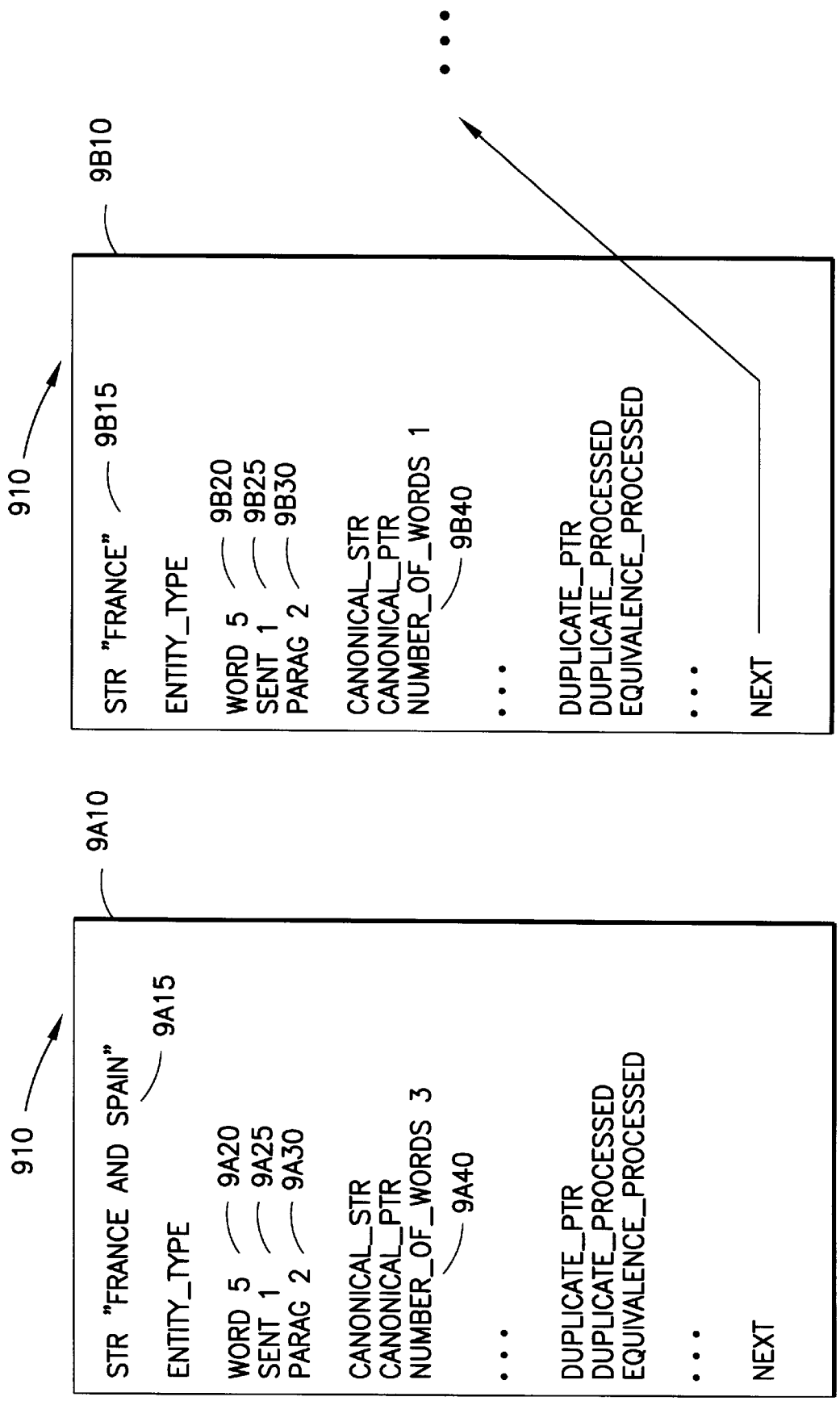
FIG. 9A is a block diagram of an example name element and attributes before splitting.
FIG. 9B is a block diagram of an example name element and attributes pertaining to a left string part after splitting.
Figure 9C:
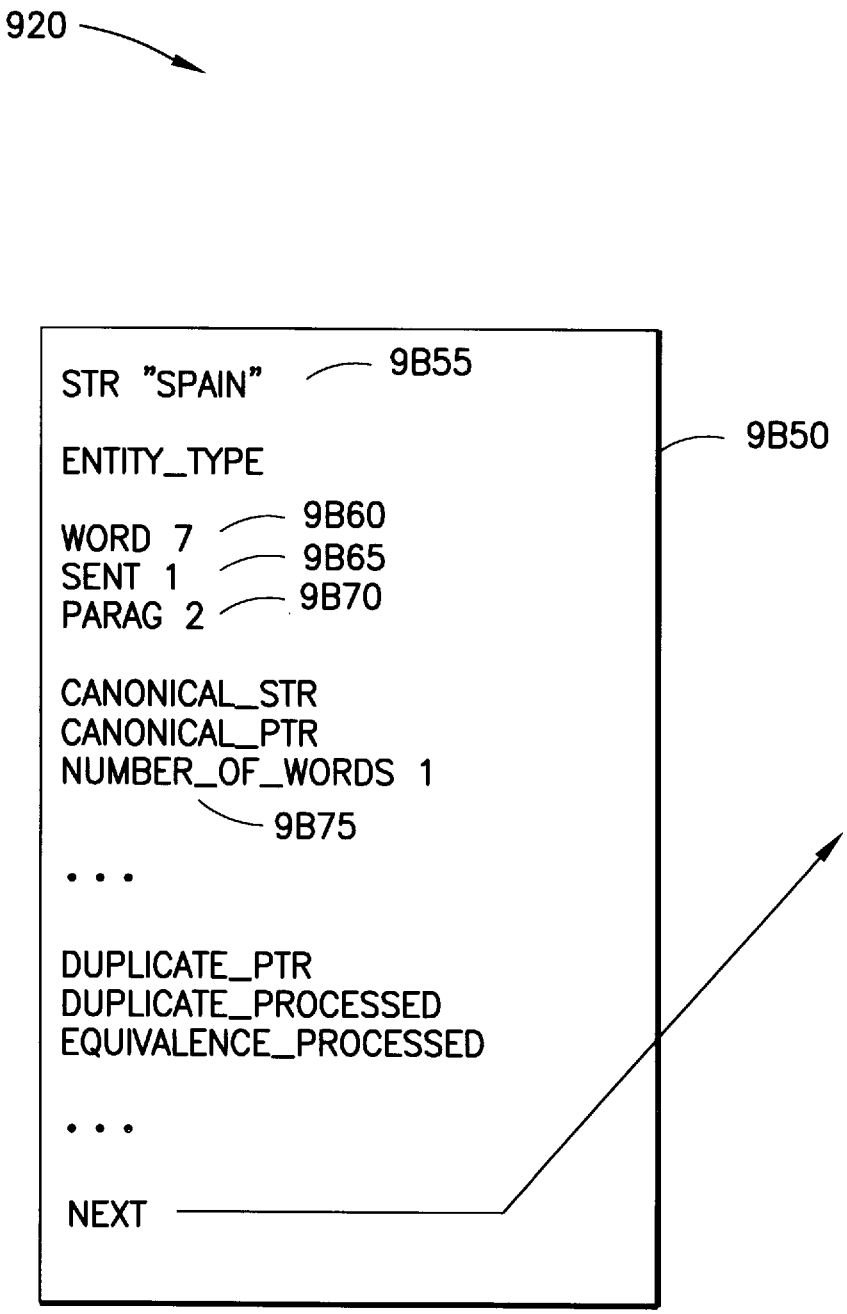
FIG. 9C is a block diagram of a new example name element and attributes pertaining to a right string part that is created after splitting.

FIG. 9 describes one example preferred embodiment of the details of a splitting block 840. In step 905, the raw name is examined for certain splitting conditions. If these don't hold, the raw name proceeds to the next splitting block 840. If the conditions hold, as for the str value of the name element 9A10 in FIG. 9A, the following modifications to the name elements on the list of name elements take place: In step 910, the value of the str attribute of the current name element is changed to contain the left part of the raw name only. The number-of-words value 440 is changed to reflect the number of tokens of type 'w' of the left part of the raw name. The updated name element 9A10 is shown as 9B10 in FIG. 9B. The new str ("France", 9B15) undergoes the name cleaning process 530 and is submitted to the recursive name splitting processor 550. A new current name element is initialized in step 920, by calling the initialization process 310. The new name element (410, 9B50) in FIG. 9C is made to hold the right part. Its 9B50 str attribute 9B55 holds the right part of the raw name. Its number-of-words attribute 9B75 and its word 9B60, sentence 9B65, and paragraph 9B70 attributes are set, as in name element 9B50 in FIG. 9B (the attribute values 9B40, 9B20, and 9B25, respectively.) The new str undergoes the name cleaning process 530 and is submitted to the recursive name splitting processor 550.

The various splitting condition-and-execution blocks 840 cause certain splitting functions to be executed if certain other splitting conditions are met. The splitting condition-and-execution blocks 840 may take the form of "execute a specific splitting function if a splitting condition is met." Non limiting examples of the various splitting condition-and-execution blocks 840 may include the following, scanning the raw name from the right to the left:

1. Split the raw name into a left part preceding "and" and a right part following it, if the raw name contains "and" followed by an all upper-case word.
2. Similarly, split the raw name into a left part preceding "and" and a right part following it, if the raw name contains "and" preceded by an all upper-case word;
3. Similarly, split the raw name into a left part preceding "and" and a right part following it, if the raw name contains "and,";
4. Similarly, split the raw name into a left part preceding "and the" and a right part following it, if the raw name contains "and the". But do not split if the left part is an organization name with strong scope (see the organization entity-type process, FIG. 15, step 1545, for details).
5. Similarly, split the raw name into a left part preceding "and" and a right part following it, if the raw name contains "and" and it contains a human name in the right part.
6. Similarly, split the raw name into a left part preceding "and" and a right part following it, if the raw name contains "and" and it contains a place name in the right part.
7. Similarly, split the raw name into a left part preceding "and" and a right part following it, if the raw name contains "and" with an optional comma preceding it and the left part and right part are organization names with similar scope strength.
8. Similarly, split the raw name into a left part preceding "to" or "'s" and a right part following it, if the raw name contains "to" or possessive "'s", and the right part is a place name or human name.
9. Similarly, split the raw name into a left part preceding "'s" and a right part following it, if the raw name contains "'s" and a place name at the end of the left part;
10. Similarly, split the raw name into a left part preceding "of" or "in" and a right part following it, if the raw name contains "of" or "in" and the symbol "&" in the right part.
11. Similarly, split the raw name into a left part preceding "of" or "in" and a right part following it, if the raw name contains "of" or "in" and a human name in the left part.
12. Similarly, split the raw name into a left part preceding a comma and a right part following it, if the raw name contains a comma and a place name in the left part.
13. Similarly, split the raw name into a left part preceding a comma and a right part following it, if the raw name contains a comma and an adjective at the beginning of the right part.
14. Similarly, split the raw name into a left part preceding ", and" and a right part following it, if the raw name contains a comma preceded by "and " and a human name in the right part.
15. Similarly, split the raw name into a left part preceding ", and" and a right part following it, if the raw name contains ", and" and an organization name in the left part with low scope strength.
16. Similarly, split the raw name into a left part preceding a left parenthesis and a right part following it, if the raw name contains a left parenthesis and no right parenthesis in the right part.
17 Similarly, split the raw name into a left part preceding a right parenthesis and a right part following it, if the raw name contains a right parenthesis and no left parenthesis in the right part.

Scanning the raw name from the left to the right:

1. Split the raw name into a left part preceding a comma and a right part following it, if the raw name contains a comma followed by an optional "and" and the left part is a human name or place name. Do not split if the right part contains a "fund" word, as listed in authority list 125 (as in "Judith and Martin Bever Foundation").
2. Similarly, split the raw name into a left part preceding the comma and a right part following it, if the raw name contains a comma and a place name on the left.
3. Similarly, split the raw name into a left part preceding "to" and a right part following it, if the raw name contains "to" followed by optional "the" and a place name on the left.

4. Similarly, split the raw name into a left part preceding "of" or "in" and a right part following it, if the raw name contains "of" or "in" and a human name on the left.

5. Similarly, split the raw name into a left part preceding "'s" and a right part following it, if the raw name contains the possessive "'s" and a place name on the left.

Figure 10:
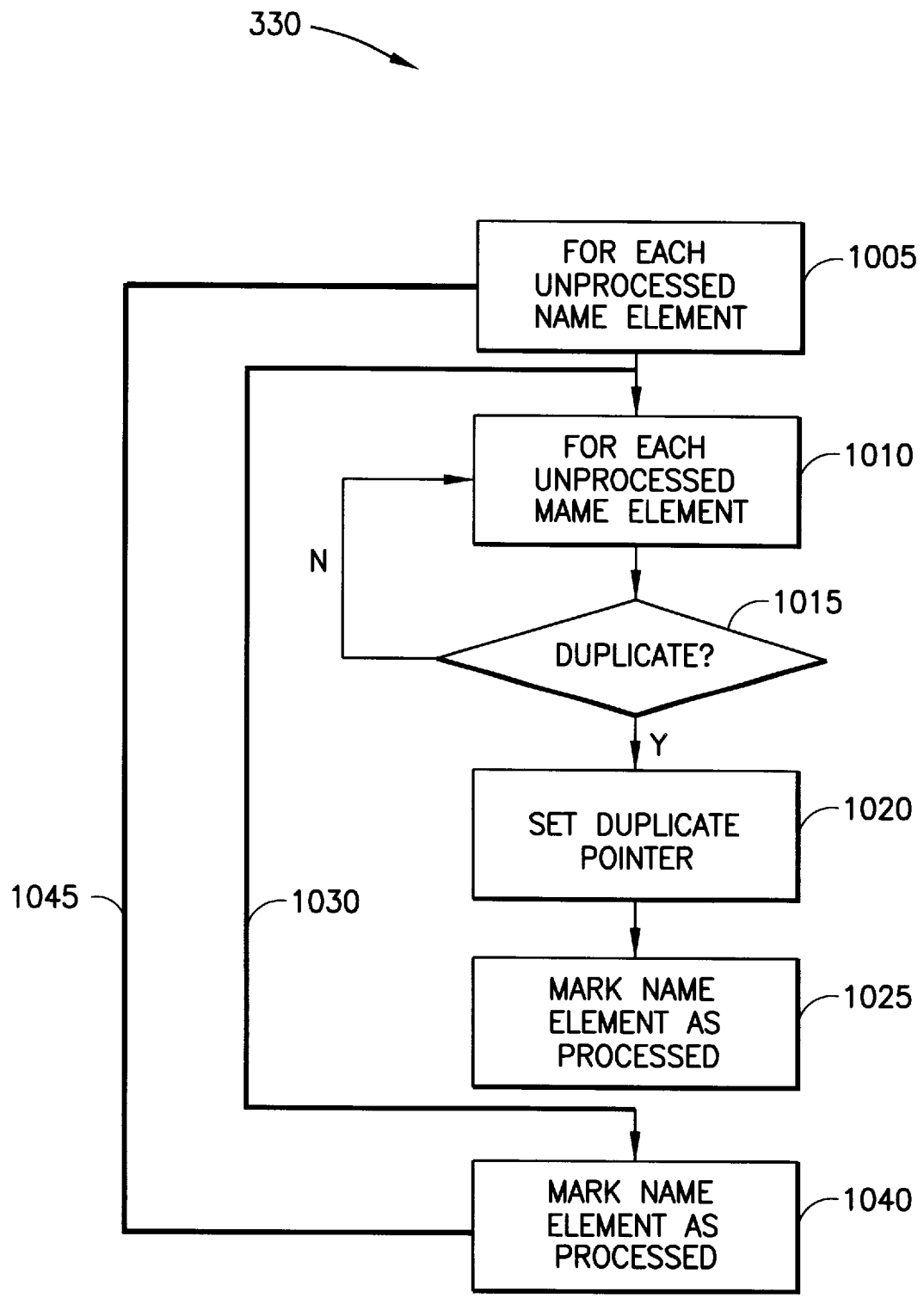
FIG. 10 is a flow chart of the steps performed by a duplicate recognition processor.

FIG. 10 describes an optional duplicate recognition processor 330. The purpose of this processor 330 is to link name elements 410 with identical (or near identical) str values 415, by making all subsequent duplicate name elements on the list of name elements point to the first duplicate name element, that is, by turning the value of their duplicate_ptr 450 from NULL to be that of the first duplicate name element. Creating the list 335, with duplicate links, allows all further processing to skip over duplicate name elements if desired. For example, only the first duplicate of each duplicate chain participates in the equivalence recognition process 340; that is only name elements with a null duplicate_ptr 450 participate. Similarly, only the first duplicate is given as input to the name aggregation processor 350. However, all duplicates are given as input to the list of name occurrences 355.

The processor 330 processes the name elements 410 on the name element list 325 in a loop within a loop. The outer loop, 1045, starts with step 1005. In step 1005 the next unprocessed name element is examined. For each name element, the name element candidate list 325 is traversed again in an inner loop 1030. When the inner loop 1030 is completed, the duplicate-processed attribute 455 of the name element being processed in the inner loop is set to YES, and it is considered processed. In step 1010 the next unprocessed name element in the inner loop 1030 is examined. If the strings of the two name elements differ, (step 1015), the inner loop resumes with the next unprocessed name element. If the strings are identical, the duplicate pointer 450 of the name element in the inner loop 1030 is set to point to the name element being processed by the outer loop 1045 and the duplicate-processed attribute 455 of the name element in the inner loop is set to YES. The name element in the inner loop is now considered processed and will not be further examined by processor 330, in the outer loop 1045.

Name elements that correspond to sentence-initial single-word names are specially treated. (These name elements have a word attribute 420 value of 1 and a number_of_ word attribute 440 value of 1) If they have no duplicates, they are removed from the candidate name list 325, on the assumption that their str is probably capitalized because it occurs at the beginning of a sentence and not because it's a valid name str.

Two name elements are considered to be duplicate if their str values are identical or near identical. For example, if one str contains a final possessive ("The Government's") and the other doesn't ("The Government"), the two are considered identical. The absence of the "'s" in one str is taken as evidence that the possessive "'s" is not a true part of the str and should be removed. In addition to processing the inner-loop name as a duplicate, the "'s" is removed from the str that contains it. (Note that if the "'s" was a genuine part of the str, it would be present in the str of all the duplicates.)

After the duplicate process 330 has applied to the name element candidate list 325, the equivalence processor 340 can be executed to operate on the list of candidate names with duplicate links 335.

Alternatively, comparisons may be made between the str value of the name elements on list 325, 335 and strings in the name dictionary 130, as described above.

Among other things, the text below describes a system and method for creating canonical forms which is claimed and described in further detail in U.S. Pat. application Ser. No. xxx, to Byrd et al., entitled System and Method for Using Canonical Forms to Develop a Dictionary of Names in Text, that was filed on the same day as this disclosure, and that is herein incorporated by reference in its entirety.

Figure 11:
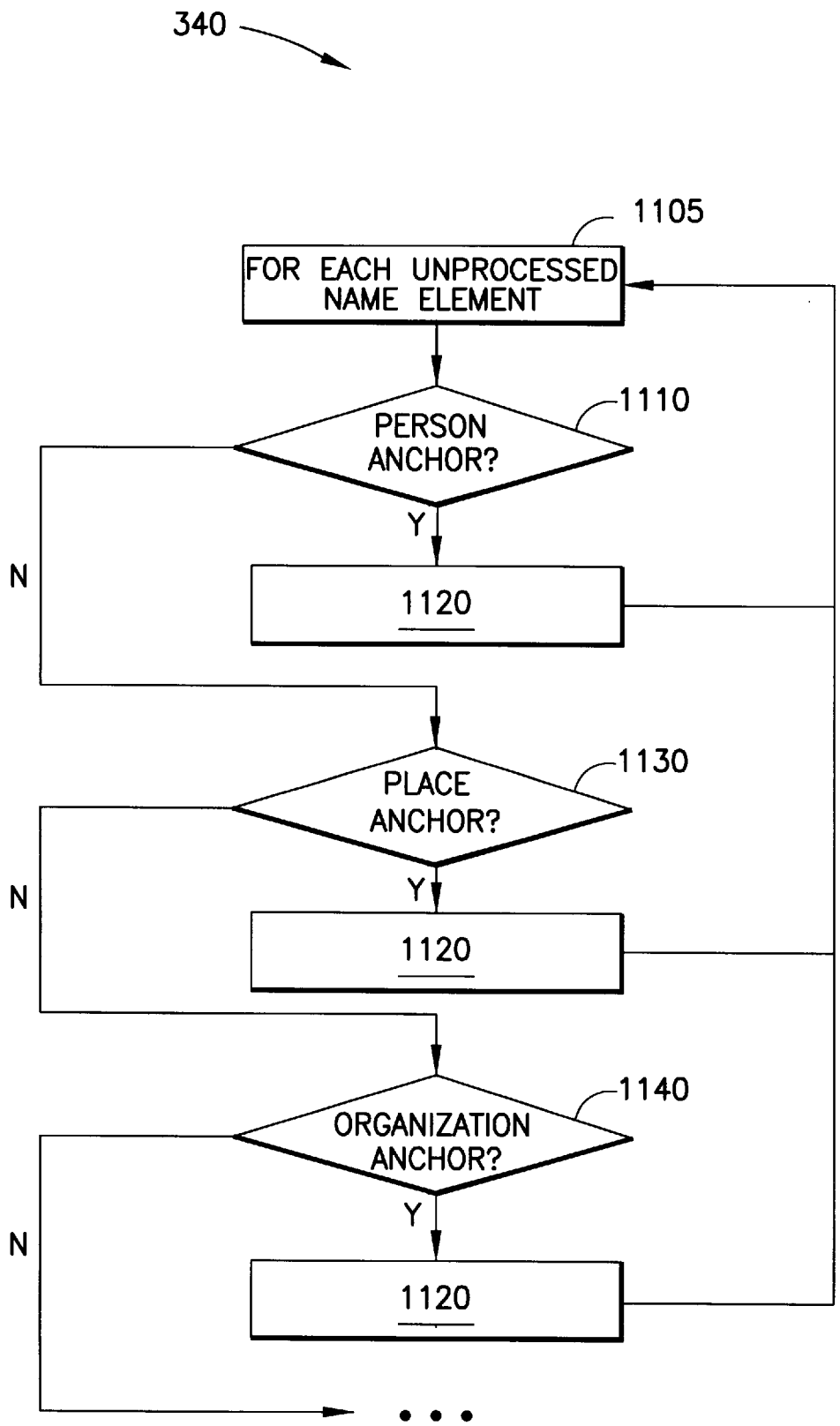
FIG. 11 is a flow chart of the steps performed by an equivalence processor.

FIG. 11 describes the equivalence processor 340, which groups together as equivalents all the name elements that refer to the same entity, establishes a canonical form for a group of equivalents, and assigns an entity type to the group. The equivalence processor 340 scans the list of name elements until it finds a name element with a high confidence score for a given entity type. This name element is defined as an "anchor". The list of name elements is scanned again to find other name elements with a low to high confidence score for the same entity type and whose other attribute values are compatible with the attribute values of the anchor. Those become the variants of the equivalence group and are linked to the anchor with equivalence links. (Confidence scores are described below.)

After all the variants are linked, a canonical form is created for the group. The canonical form is the least ambiguous, most explicit name that can be composed from the various attribute values of the anchor and variants. The canonical form may be identical to a str value of one of the anchor/variants, or it may be a composite (see below). This novel canonical form is a superior identifier of the anchor and all of the variants in the equivalence group. By using this canonical form, a system can quickly and accurately identify all mentions of a name (including variants) in text. This is useful in searching and processing text within a single document as well as across a plurality of documents.

The equivalence processor 340 processes the name elements 410 on the name list 325 in a loop. In step 1105 the next unprocessed name element is examined for equivalence. In step 1110 it is evaluated as to whether it is a person name, by the entity-type process described in FIG. 14. When a name element is determined to be of a certain entity type (e.g. person, place, organization, etc.), its relevant attributes are filled with appropriate values if they can be identified (see FIGS. 14, 15, and 16). In the case of a person anchor, for example, all known attributes, such as first name, middle name, last name, gender, etc. are filled.

If the person entity-type processing of the name element 410 being processed results in a high confidence score, the name element is taken to be a person anchor. (An "anchor" is a name that has been reliably typed, i.e., an entity type has been assigned.) The anchor is further processed in step 1120 (see FIG. 12). The equivalence-processed attribute 460 of the name element is set to YES and it is now considered processed. Processor 340 resumes with the next name element to be processed for equivalence, in step 1105. If it is not a human anchor, it is evaluated as to whether it is a place anchor in step 1130 (see FIG. 16), and if it is, it is further processed as such 1120. If it is not a place anchor, it is evaluated as to whether it is an organization anchor in step 1140 (see FIG. 15). If it is an organization anchor, it is processed 1120 as such. If not, it is similarly processed for other types of anchors, such as events, works of art, economic or legal entities, and products.

Figure 12:
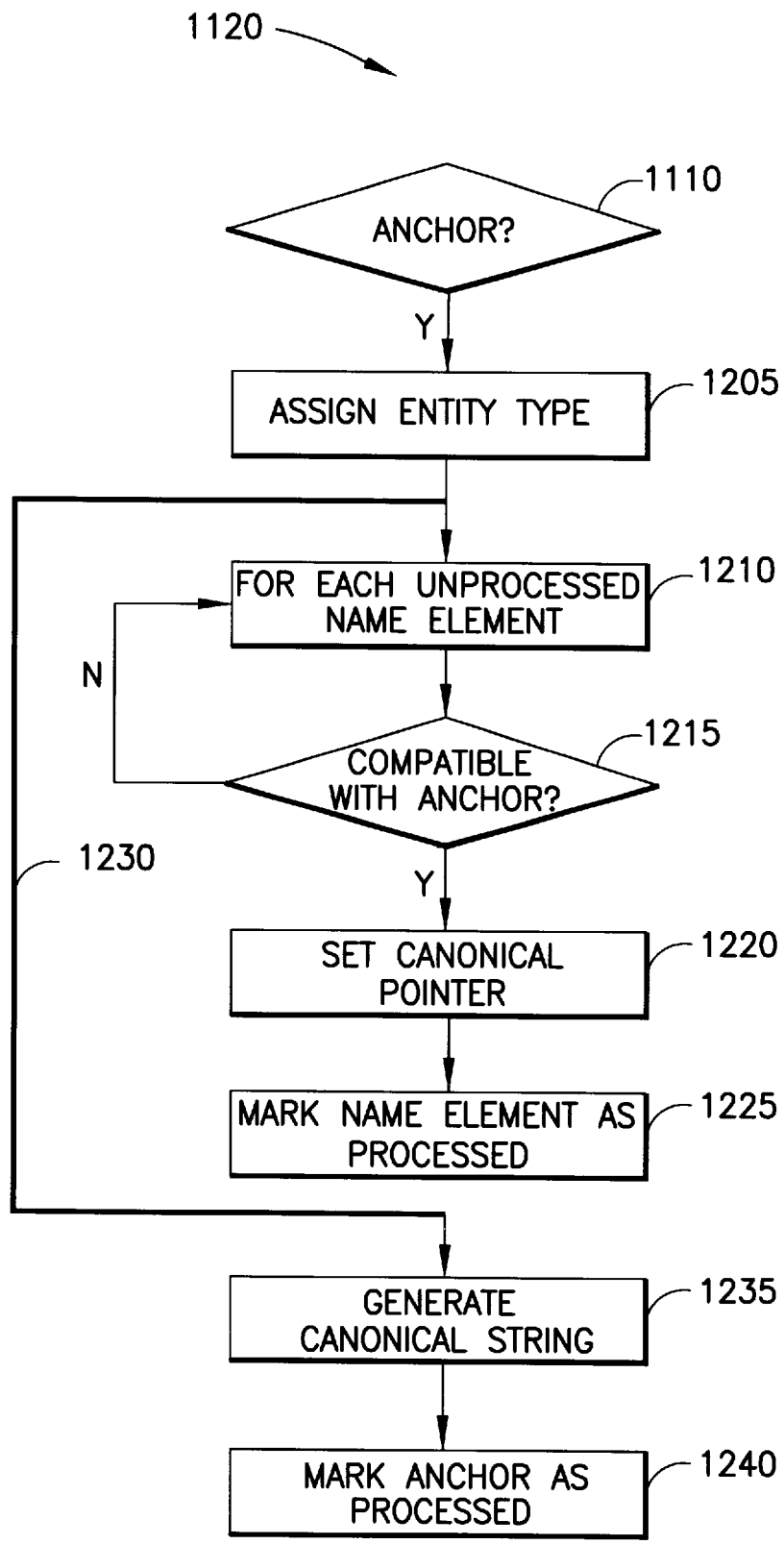
FIG. 12 is a flow chart of substeps performed by an equivalence processor.

FIG. 12 describes the Equivalence Processing Step 1120. If the name element being processed is found to be an anchor of a certain type (for example, person), it is assigned the appropriate entity type in step 1205 (for example, PERSON). The list 325 of name elements 410 (i.e., the linked list 325 of the data structures 410) is then traversed in an inner loop 1230. Each name element not yet processed for equivalence is examined in the inner loop (step 1210). If it is not compatible with the anchor, the inner loop 1230 resumes with the next unprocessed name element 410. If it is compatible, its canonical-pointer attribute 475 is set to point to the anchor (step 1220) and it is considered a variant of the anchor. In step 1225, the variant is marked as processed (attribute equivalence-processed 460 in FIG. 4 is set to YES) and the inner loop 1230 resumes with the next name element not yet processed for equivalence.

To determine whether the current name element is compatible with the anchor in step 1215, the current name element is examined as to whether its str contains any common words with the anchor's str, or is a possible abbreviation or acronym of the str of anchor 1300. If so, the current name element is further examined as to whether it is of the same entity type as the anchor. If it is, its attributes that are relevant to the entity type (e.g. first name and last name for PERSON) are set to the appropriate values. The values of the anchor's attributes are compared to the values of the attributes of the name element processed in the inner loop. The two name elements are said to be compatible if the values of their attributes do not contradict. For example, if the anchor's first-name attribute is "A." and the first-name attribute of the inner-loop name element is "Alan" then the two do NOT contradict. But if the anchor's last name is "Smith" and the last name of the inner-loop name element is "Soames", then the last name elements contradict and they are not compatible. If the attribute values are compatible but not identical, the anchor's attributes may need to be updated, if the inner-loop name element contains more complete values. For example, if the anchor's first-name attribute consists of an initial only (e.g., "A.") and the inner-loop name element's first-name attribute is a full first name, (e.g., "Alan"), the anchor's first-name attribute is updated with the full first name, i.e., the most complete. We define "most complete" as longest string.

When the inner loop 1230 terminates, and all the variants that are compatible with the anchor have been processed and they point to the anchor, the anchor and the variants are considered to form an equivalence group. (It is possible that no variants were found to be compatible with the anchor, and so the anchor is the only variant in its equivalence group.)

A canonical form is generated for the group in step 1235. The canonical form becomes the value of the anchor's canonical_str attribute 470. Finally, the anchor is marked as processed in step 1240.

The canonical form for an equivalence group can be identical to the anchor str (in the case of economic entities or products, for example) or it can be manufactured by concatenating values of selected attributes, as follows.

In one preferred embodiment, the canonical_str for a person name is generated as follows:

If there is no first name or no last name, but there is a professional title attribute, include the professional title in the canonical_str (e.g., "Professor Kahn" or "King Faisal");

Else, if there is no professional title and no first name, but there is a personal title, include it in the canonical_str (e.g., "Mr. Smith");

If there is a first name, and/or a middle name concatenate them to the canonical_str.

If there is one or more name prefixes concatenate them to the canonical_str (e.g. "Antoine de St. Exupery").

If there is a last name concatenate it to the canonical_str.

If there is a name suffix concatenate it to the canonical_str (e.g., "Martin Luther King Jr.").

In one preferred embodiment, the canonical_str for a place name is generated as follows:

Start the canonical_str with the value of the place attribute. (e.g., "Paris");

If there is a bigger-place attribute, concatenate it with a comma to the canonical_str (e.g. "Paris, France"). A bigger-place attribute value exits as a result of the place-entity process. If the name element's str contains a country name or a U.S. State name (as listed in authority list 125) following a comma, the place-entity process assigns it to the bigger-place attribute.

In one preferred embodiment, the canonical_str of an organization is the value of the organization-name attribute.

In a preferred embodiment, the equivalence processor 340 described in FIG. 11 executes twice. During the first execution, anchors are established only if the confidence score returned from the entity-type check is high. The entity types PERSON, PLACE, ORGANIZATION, etc are assigned to the equivalence groups as a result, as described above.

During the second execution, anchors are accepted with lower confidence scores. The entity types assigned to them are weaker, such as PERSON?, or PLACE? Examples of PERSON? names are "William Hall" or "Murray Hills"; Examples of PLACE? names are "Mt. Sinai, N. Y." or "Arlington, Va.". (The "?" indicates the lower confidence level.) (See the discussion of the entity-type processes below.)

Name elements that did not categorize as any entity type are assigned the entity type UNCAT, for uncategorized. UNCAT name elements are:

1) Name elements that are truly not of the entity-types currently implemented (e.g. "Star Bellied Sneetches", creatures from a Dr. Seuss book, mentioned in a Wall Street Journal article);

2) Name elements with various non-name str values that are nevertheless capitalized in the text, such as the first few words of the leading paragraph;

3) Name elements that did not get any confidence score in any of the entity-type processes (e.g., "IBM" in the absence of "International Business Machines" in the same article). Many of these name elements are properly associated with their canonical form by the Aggregator (see below).

4) Misc. errors.

Figure 13:
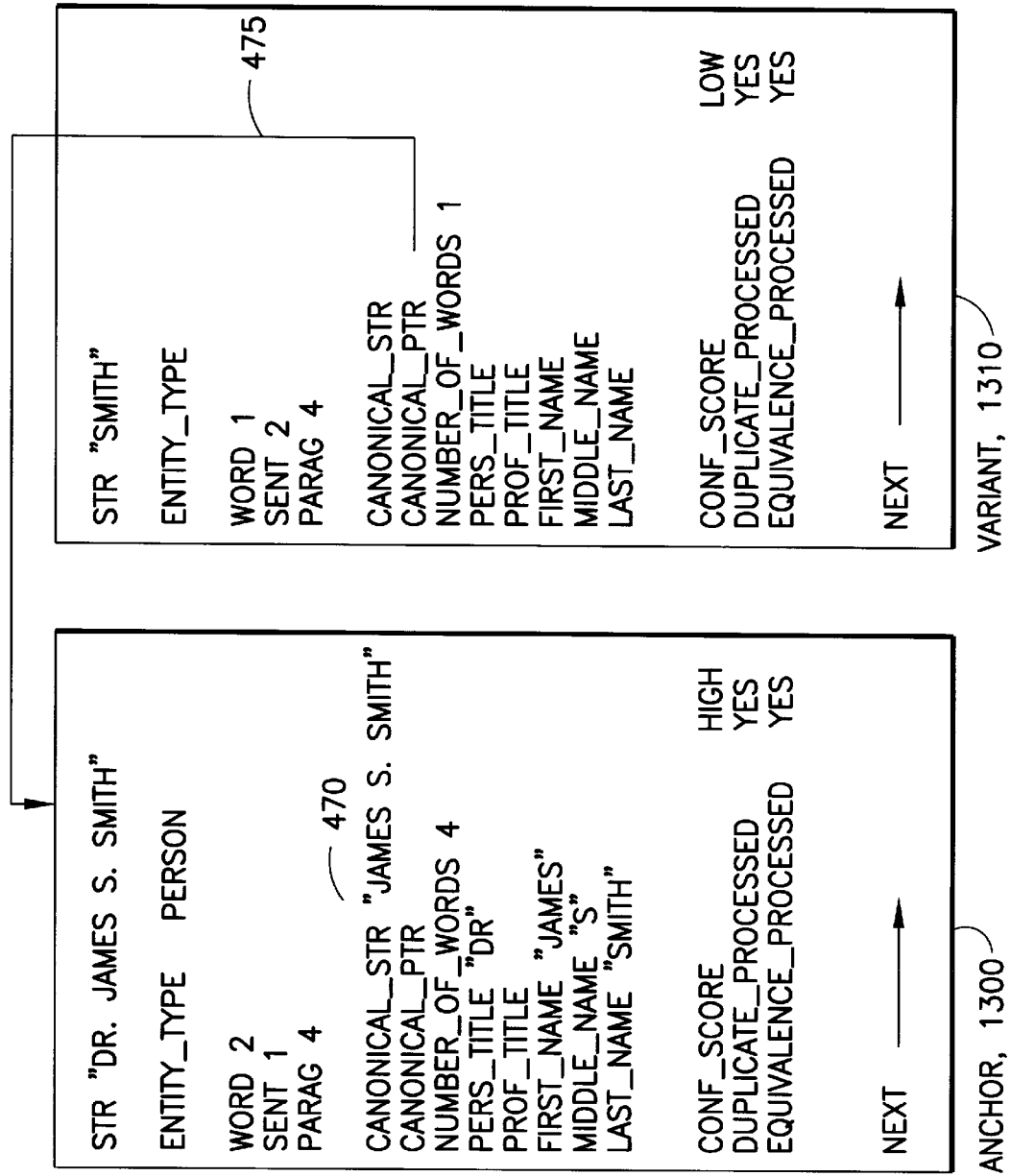
FIG. 13 is a block diagram of the name data structure with equivalence links between name elements.

FIG. 13 shows the name elements on the name linked list after the entity-type processing (see below) has applied and the values for the relevant attributes set. (See FIG. 17 for details.) The equivalence processor 340 has also executed and the canonical_str attribute 470 of the anchor 1300 has been set. The canonical_ptr attribute 475 of the variant name element 1310 has been set to point to the anchor 1300. The processing of the name list 325 is now complete. Every variant in the equivalence group points to the anchor 1300 which contains the canonical_str 470 (canonical form) that best represents every name element in the equivalence group.

Figure 14A:
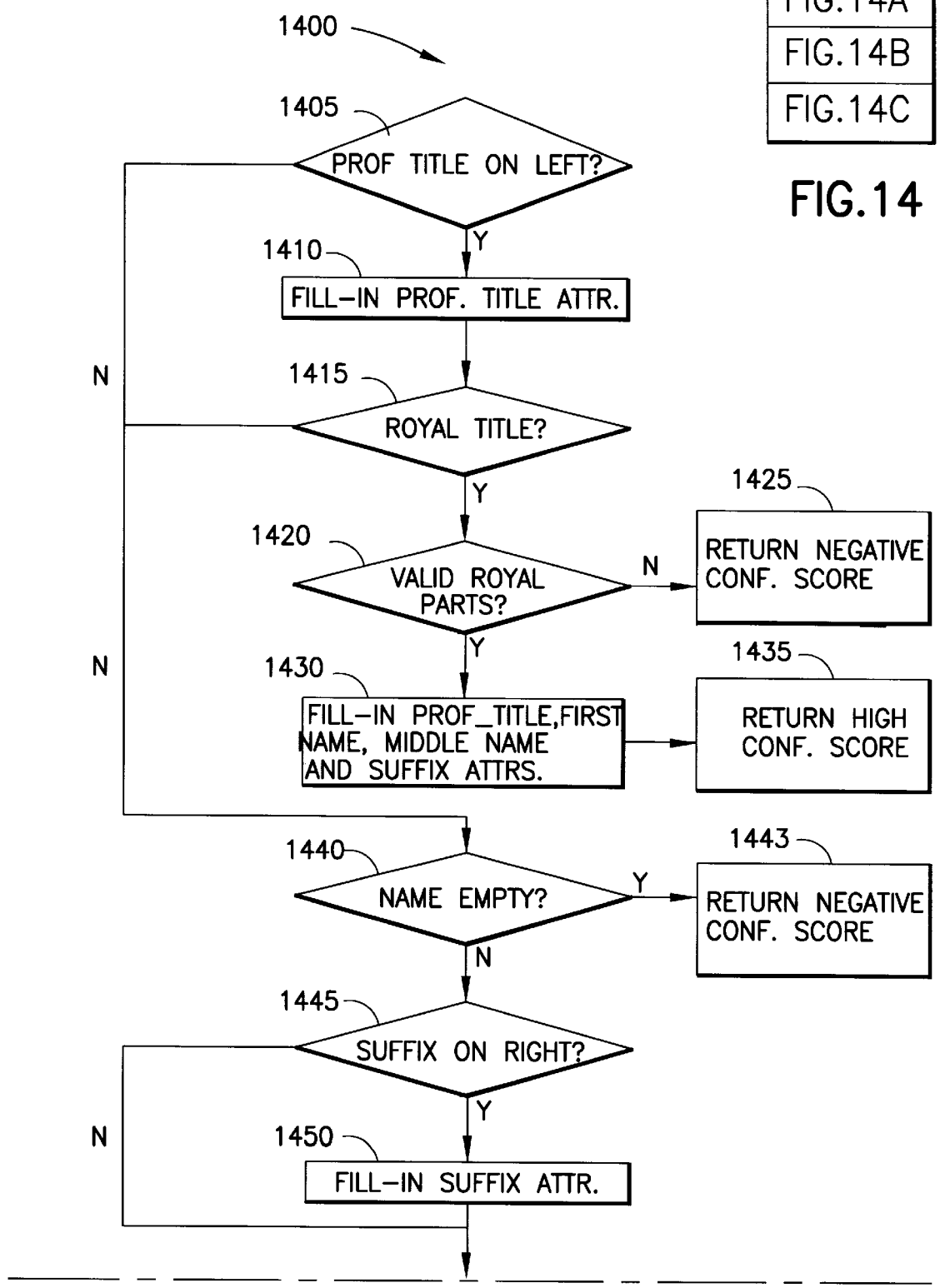
Figure 14A, 14B, and 14C are the actual flow chart.
Figure 14B:
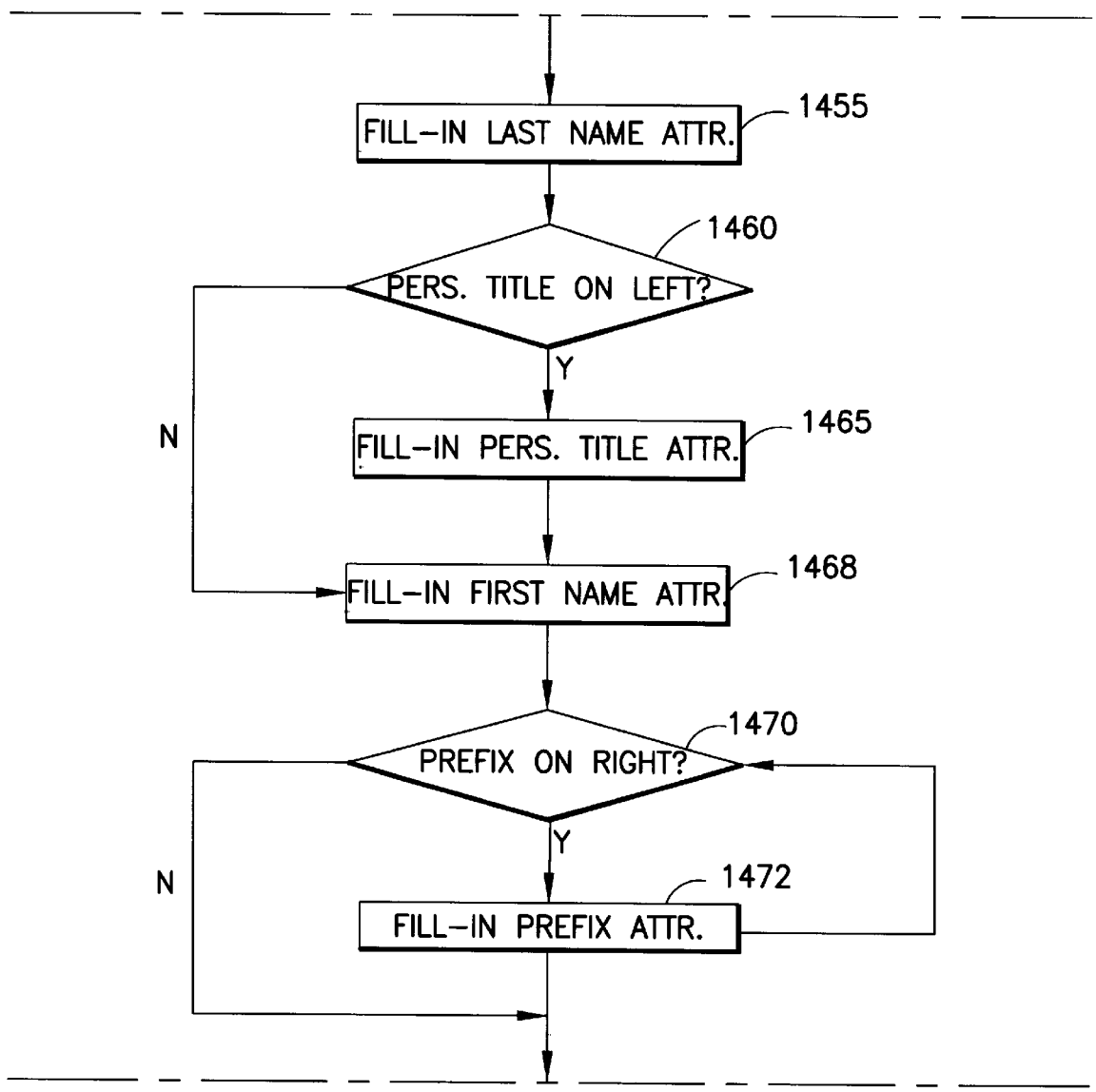
Figure 14C:
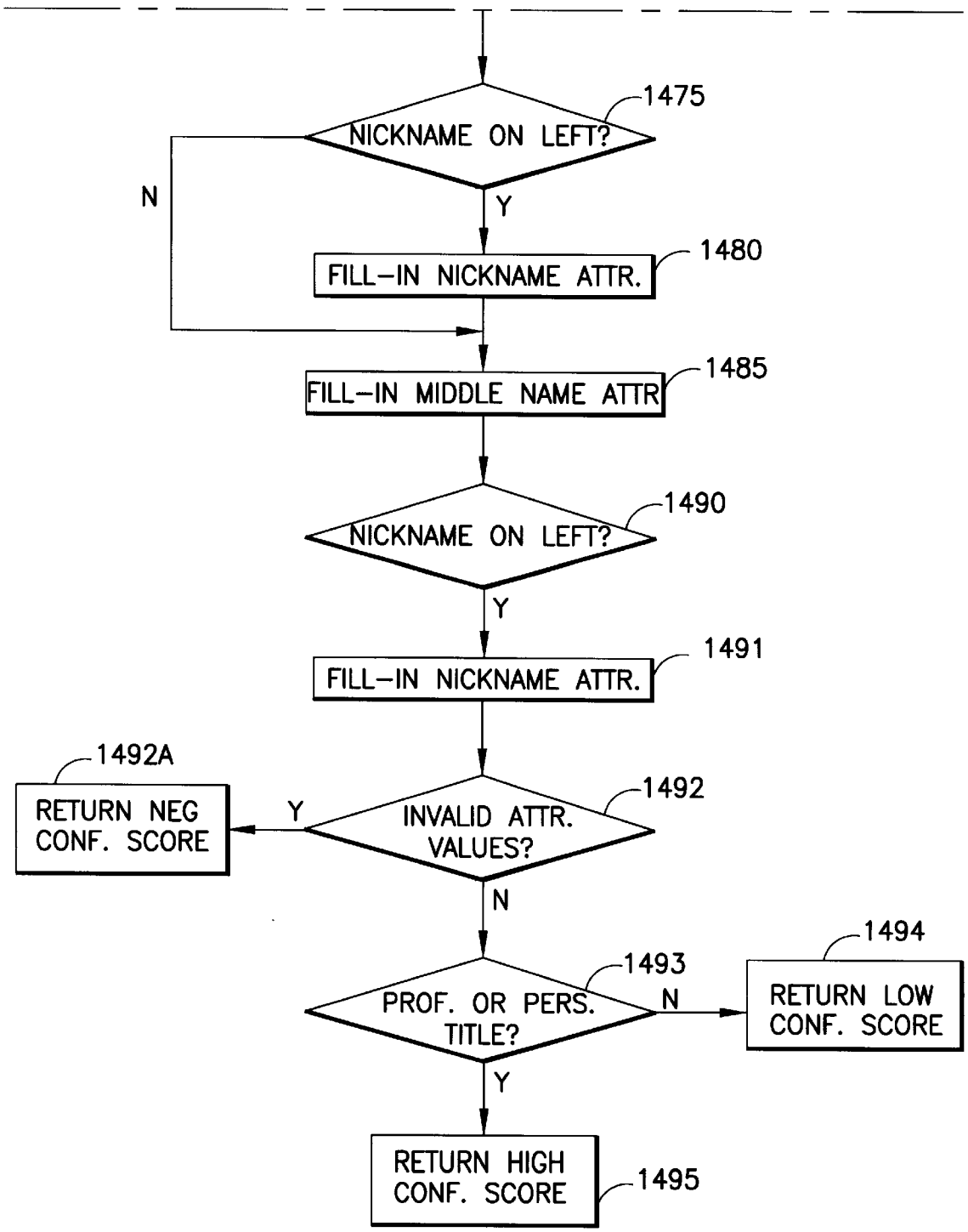
Figure 15A:
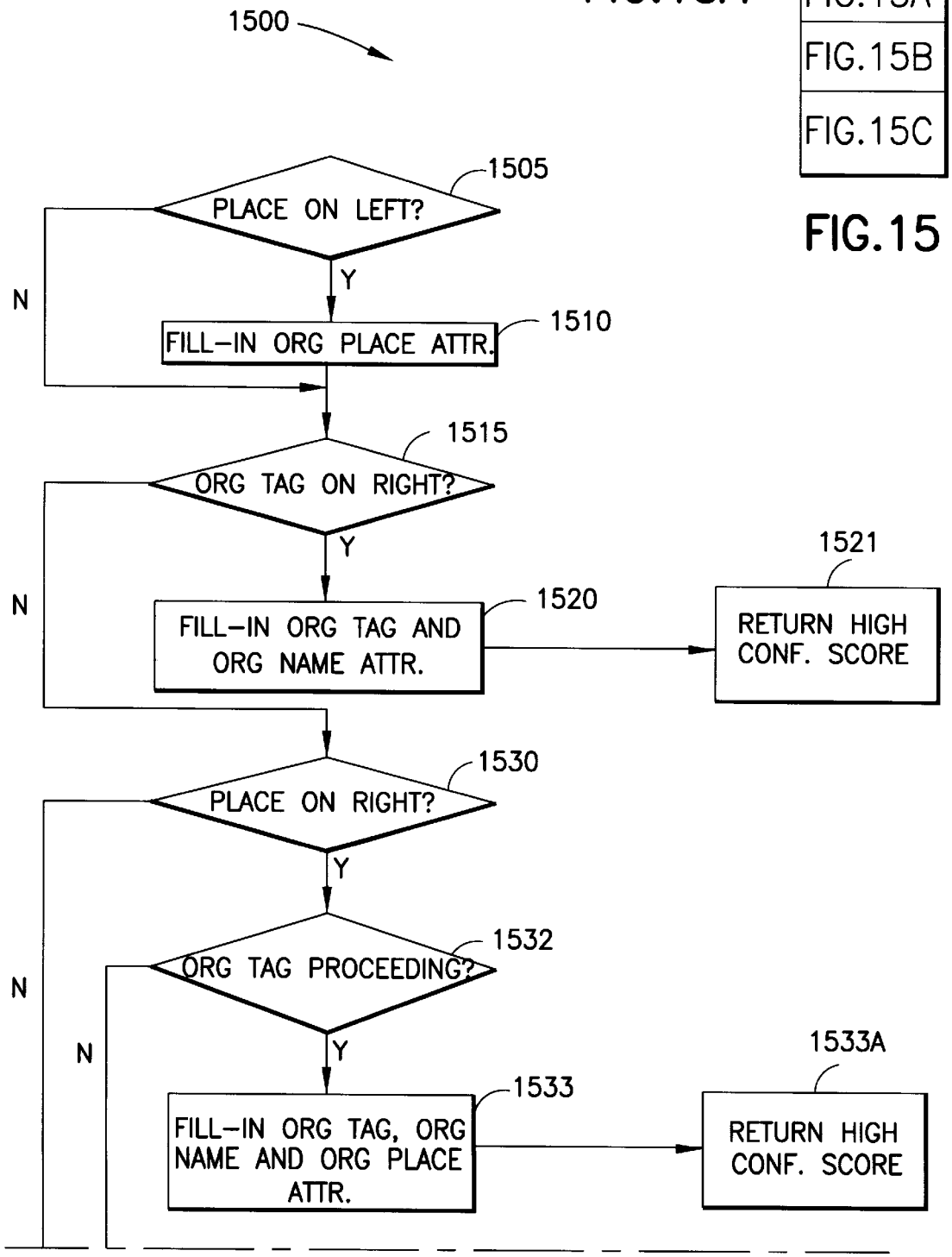
Figure 15A, 15B, and 15C are the actual flow chart.
Figure 15B:
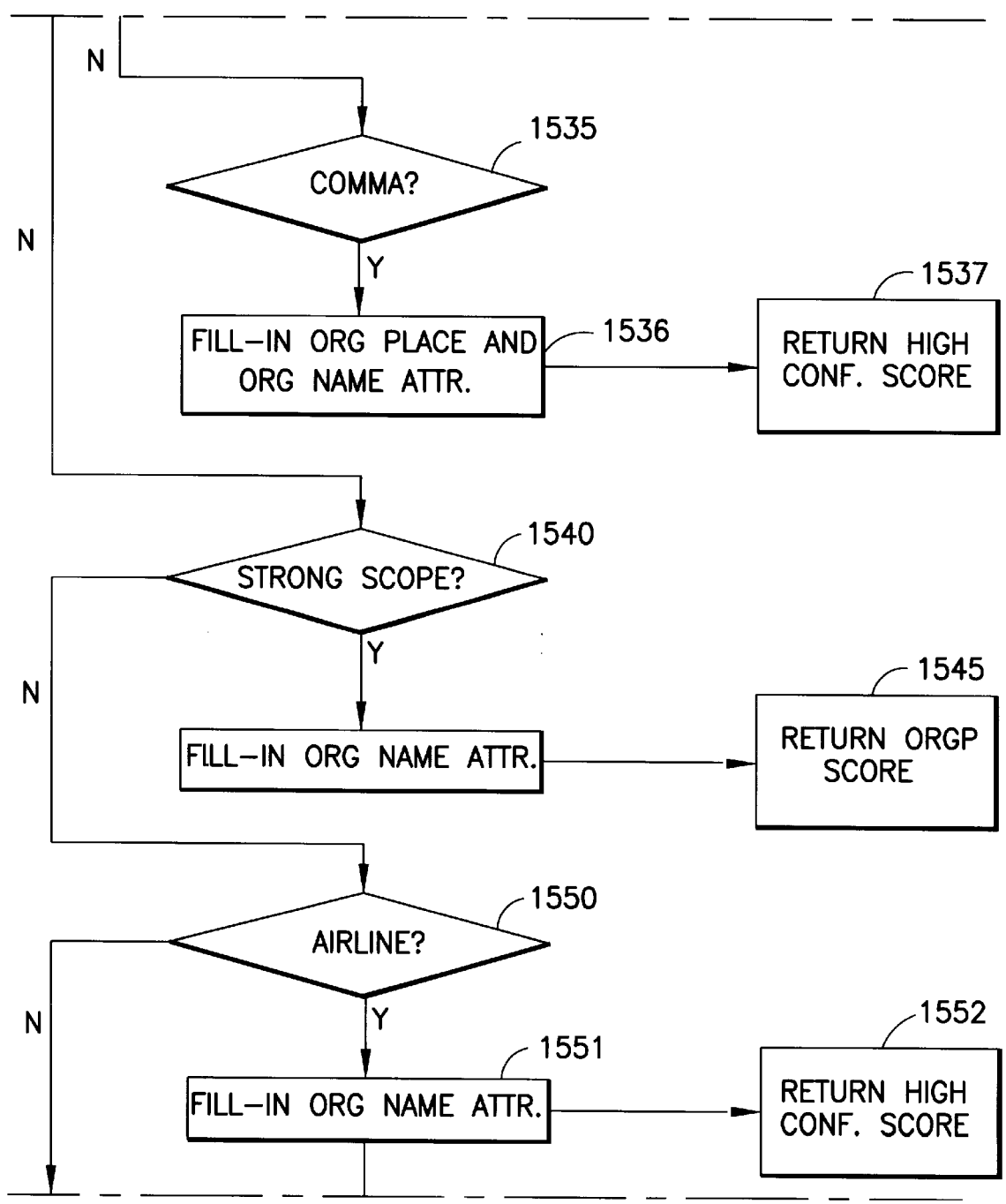
Figure 15C:
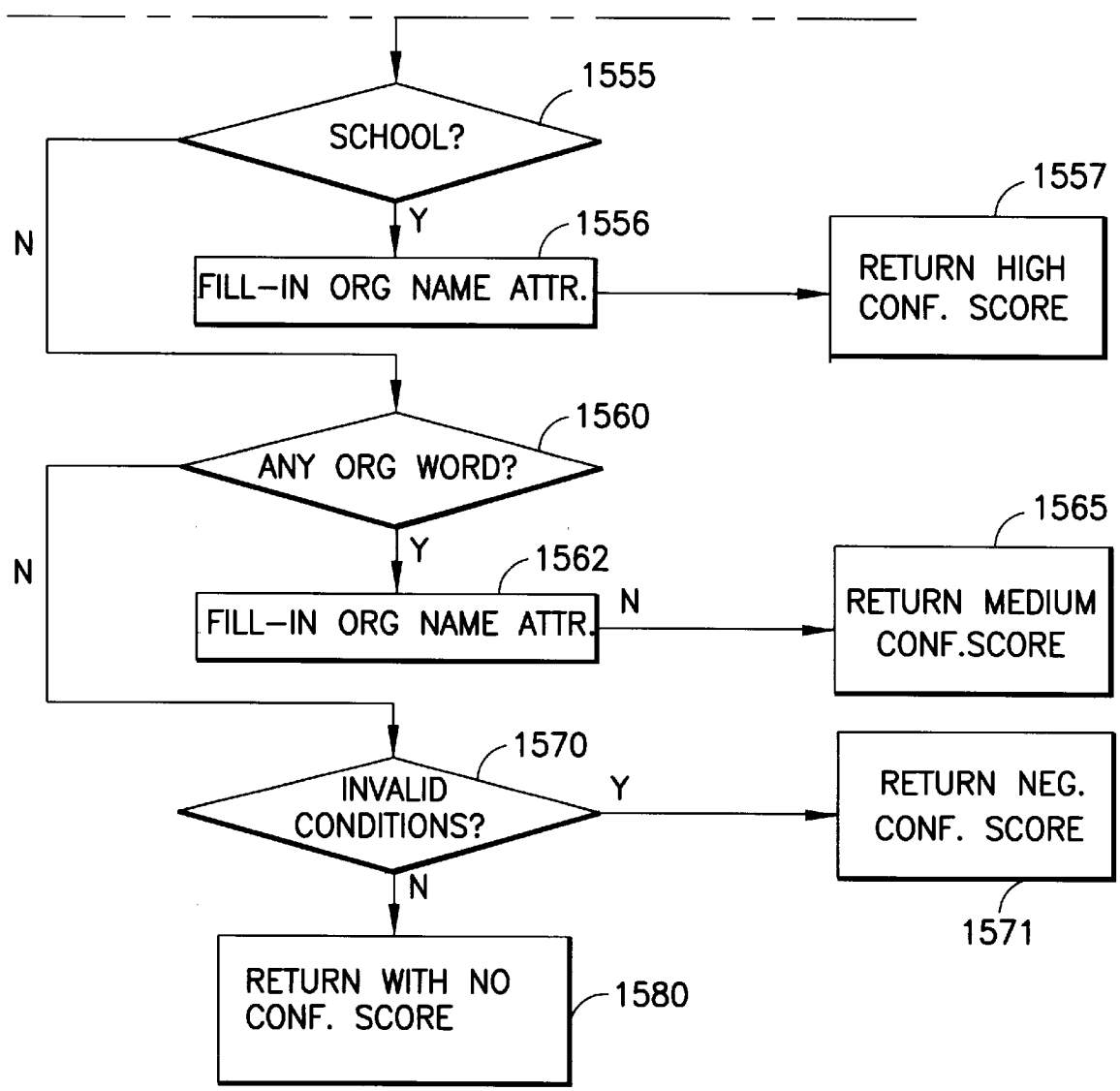
Figure 16B:
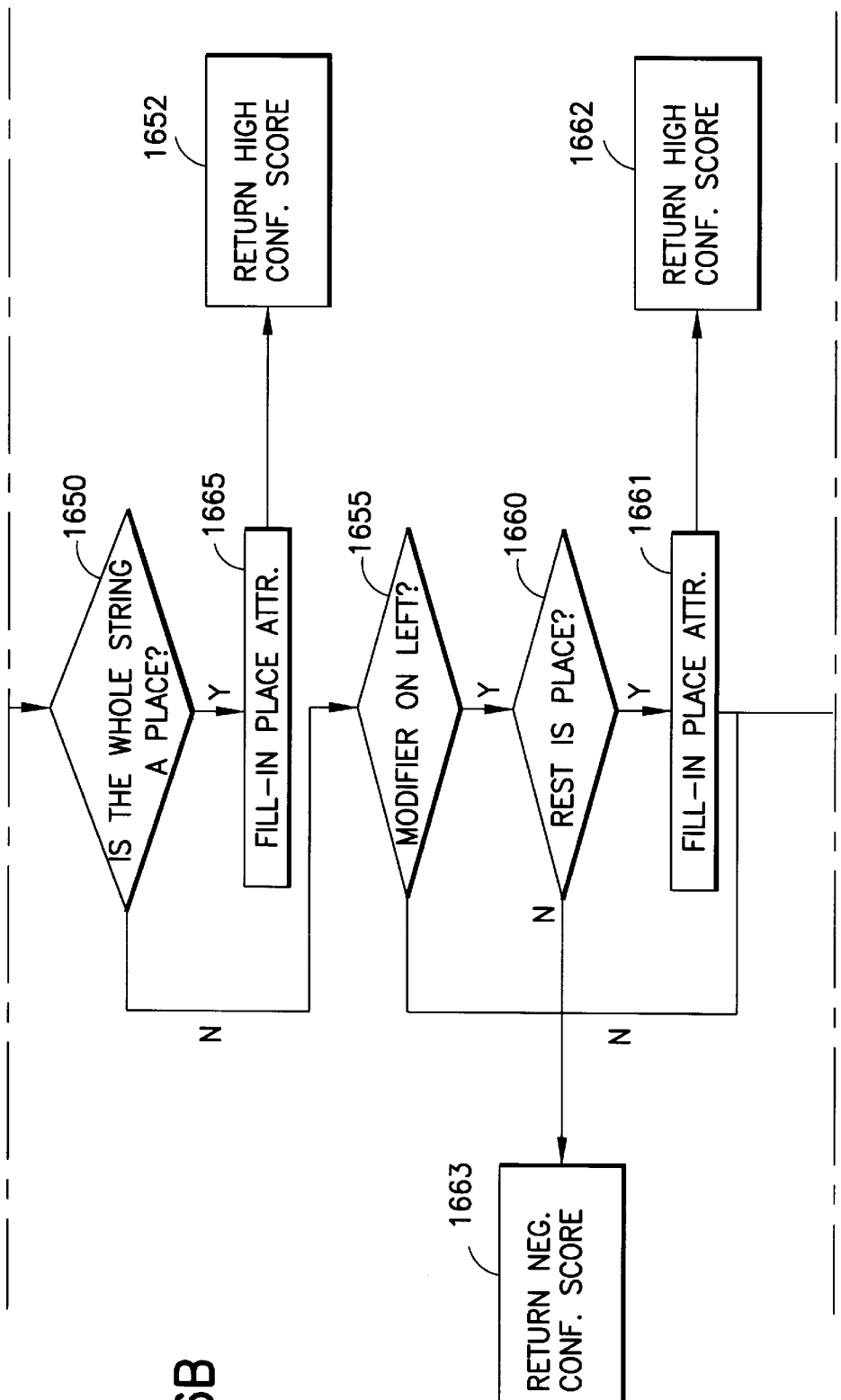
Figure 16C:
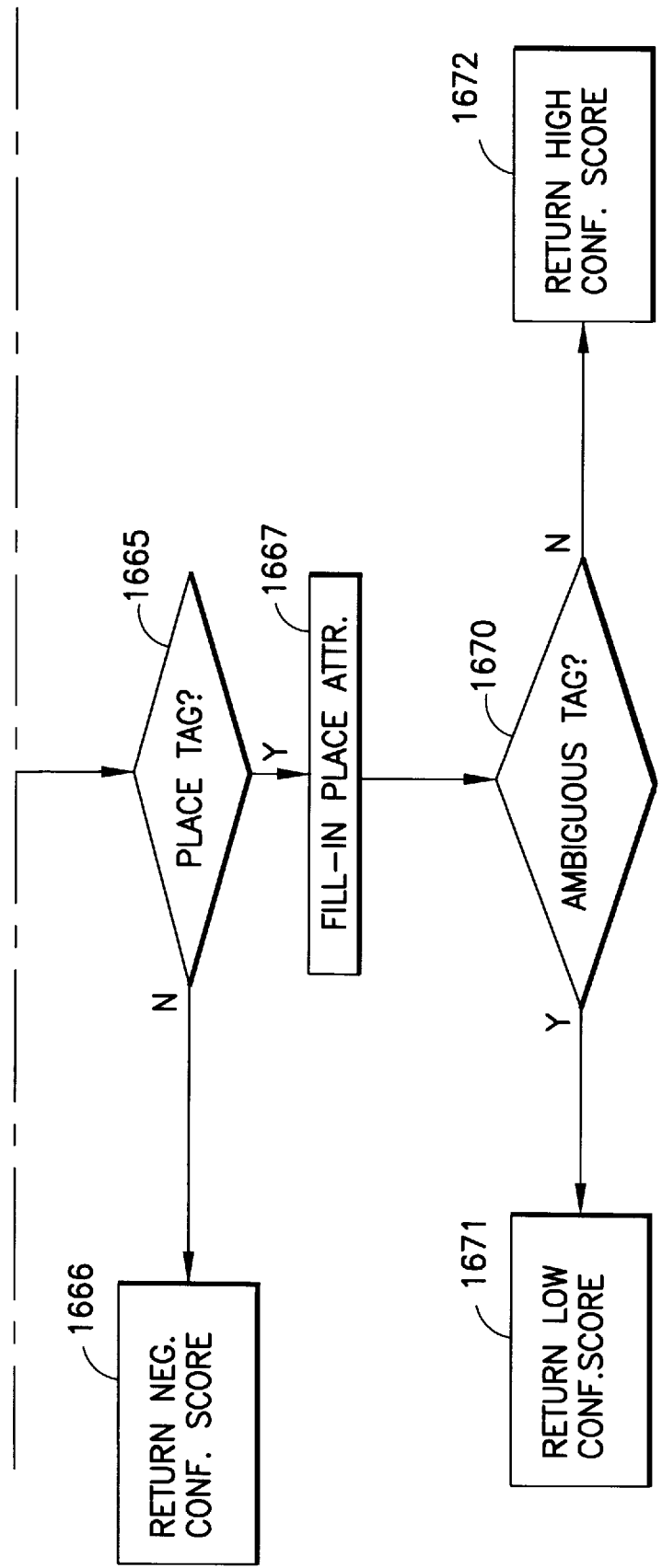

FIGS. 14 to 16 describe three entity-type check processes. These processes analyze the str value of a name element to determine whether the name element could be assigned a certain entity type. The analysis is carried out on a "working copy" of the str attribute. The working copy starts as an exact copy of the str value, but as substrings of it (from the left or from the right) are determined to be potentially valid values of certain attributes, the substrings are removed from the working copy. At the end of the process, the working copy is discarded. The analysis results in a certain confidence score. If the confidence score is high enough, the entity type is assigned to the name element and the values of the relevant attributes are set.

FIG. 14 describes the person entity-type process 1400, which processes the working copy of the name element str to determine if it is of entity type person. Refer also to FIG. 17. The copy is scanned for various name parts, such as first name or name suffix, as listed in the authority list 125. When these are identified, they are removed from the copy and used as values of the various person-related attributes of the name element. The process continues until all the analyzable parts have been identified and removed and a confidence score is returned. If a high confidence score is returned, the entity-type attribute is set to PERSON.

Step 1405 examines whether the copy contains a professional title on the left. The string is scanned from left to right until the rightmost professional-title word is encountered, as specifically listed in the authority list 125. Everything to the left of such a word is considered to be the professional title 1713 (e.g., "Junior Assistant Professor" in "Junior Assistant Professor Jane Smith"). In addition, if the professional title word is marked in list 125 with a specific gender (e.g. "assemblyman" is marked as masculine), the gender attribute value is set to either 'm' or 'f', as appropriate. Next, if a prepositional phrase follows the professional title, such as "of Public Affairs" in "Secretary of Public Affairs", the copy is scanned left to right until the rightmost domain word is encountered (such as "Affairs", "Budget", or "Psychology"). The full prepositional phrase is added to the professional title. The professional title is removed from the working copy and placed as the value of the professional title attribute 1713 in step 1410.

In step 1415, if the rightmost professional-title word is a royal word, such as "King", the name element will be processed as a royal name in steps 1420–1430. In 1420, a few tests apply: If the royal title word is preceded by any other word, is it preceded by another royal word ("Majesty King . . . "), a country ("Jordan King . . . ") or an adjective ("Jordanian King . . . ")—as listed in authority list 125? Does a first name follow the royal title? If anything follows the first name, does a middle name follow the first name? (e.g., "Pope John Paul") and/or does a Roman numeral follow (e.g. "Queen Elizabeth II")? If any of these conditions fails, the name is invalid (e.g. "Prince Charles Island") and a negative confidence score is returned in step 1425. Otherwise, the values prof_title 1713, first_name 1714, middle name 1715 and name_suffix 1719 for the name element are filled and a high confidence score 1704 is returned, in step 1435.

If there are no more words left in the working copy after the title has been removed in step 1440 a negative confidence score is returned in step 1443.

In step 1445, the working copy is scanned from the right for the presence of a suffix (e.g. "Sr."). If one exists, it becomes the value of the suffix attribute 1719 in step 1450. In addition, the gender attribute value 1711 is set to 'm'. In step 1455 the rightmost word of the working copy becomes the last-name attribute value 1718. In step 1460, the working copy is scanned from the left for the presence of a personal title (e.g. "Mr."). If one exists, it becomes the value of the pers_title attribute 1712 in step 1465. In addition, if the personal title word is marked in list 125 with a specific gender, the gender attribute value 1711 is set appropriately.

In step 1468 the leftmost word of the string copy becomes the first_name attribute value 1714.

In step 1470 the last word of the working copy is examined. If it is a name prefix (e.g. "de"), it becomes the value of the prefix attribute 1717 in step 1472, and is removed from the string copy. Steps 1470–1472 are repeated until there are no more prefixes.

In step 1475 the first word of the working copy is examined. It is considered to be a nickname if it occurs in quotes or parentheses. If it is a nickname, it becomes the value of the nickname attribute 1716 in step 1480. In step 1485 the first word of the working copy is taken to be the value of the middle-name attribute 1715. In step 1490 the first word of the working copy is tested as a nickname. (A nickname may follow either the first name or the middle name.) If it is a nickname, it becomes the value of the nickname attribute in step 1491.

The analysis of the person name parts is now finished. In step 1492 the combination of the various person attribute values is inspected. Some combinations may result in an invalid person name. For example, if there is no personal title and no first name, and the last name is a word that is listed as an organization word (e.g. "Department") in the authority list 125, the name is considered to be invalid and a negative score is returned 1492A. Step 1492 will return a negative score for "Justice Department" but not for "Justice Johnson". In step 1493, the presence or absence of a personal title attribute is checked. If there is no personal title value, a low confidence score is returned (e.g. "Ruth Lake") in step 1494. Otherwise, a high confidence score is returned (e.g. "Mrs. Ruth Lake") in step 1495.

FIG. 15 describes the organization entity-type process 1500. In step 1505 the working copy of the str is examined. If it contains a place phrase on the left (as in "California-based Apple"), the place phrase becomes the value of the organization-place attribute 1705 (as shown in FIG. 17) in step 1510. In step 1515 the rightmost word of the copy is examined. If it is an organization tag (e.g. "Inc."), it becomes the value of the organization-tag attribute 1703 in step 1520. Also in step 1520, the remainder of the working copy becomes the value of the organization-name attribute 1702 and a high confidence score is returned in step 1521. When a high confidence score is returned, the entity-type attribute 1701 is set to ORG. (See its value in FIG. 17.)

If there is no tag on the right, the working copy is scanned from the right for a place name in step 1530. If a place exists (e.g. "United Steel Inc. of America"), the copy is scanned in step 1532 for an organization tag that may precede it. If a tag precedes the place, the place name (e.g. "America") found in step 1530 becomes the value of the organization-place attribute 1705; the tag (e.g. "Inc.") becomes the value of the organization-tag attribute 1703; and the remainder of the working copy to the left of the tag (e.g. "United Steel") becomes the value of the organization-name attribute in step 1533. A high confidence score is returned 1533A.

If an organization tag does not precede the place, the copy is scanned for a comma preceding the place in step 1535. (e.g. "United Steel, Boston, Mass.") If a comma exists, the words to its left become the value of the organization-name attribute 1702 and the words to its right become the value of the organization-place attribute 1705 in step 1536. A high confidence score is returned 1537.

If there is a place name on the right (step 1530) but neither a tag nor a comma preceding it ("The Association of Musicians of Greater New York") or if there's no place on the right, the process resumes in step 1540. The working copy is scanned for the presence of an organization word with strong scope, as listed in authority list 125. Organization words with strong scopes are words that tend to be the syntactic heads of phrases and conjunctions that follow them; that is, they often include following phrases and conjunctions within their scope, and those phrases and conjunctions act as modifiers for the strong-scope words. For example, in "The Commission for the Protection of Animals and Children", the phrase "for the Protection of Animals and Children" is within the scope of "Commission" and modifies it. If a strong-scope organization word is found, return an ORGP confidence score in step 1545, which is both a high confidence score and indicates potential modification on the right. Scope strength is used by the splitting processor (above), to determine whether to split a name on a conjunction or a preposition or not.

If step 1540 failed, the working copy is scanned in step 1550 for an airline word, such as "Airlines" or "Air", as listed in authority list 125, and an adjective or country name. If the tests succeeds, the org name attribute 1702 is filled in step 1551 and a high score 1552 is returned.

If step 1550 fails, the working copy is scanned in step 1555 for a school word, such as "High School", as listed in the authority list 125. If a school word is found, the org name attribute 1702 is filled in step 1556 and a high confidence score is returned in step 1557.

If step 1555 fails, the working copy is scanned in step 1560 for any organization word, as listed in authority list 125. If one is present, the org name attribute is filled in step 1562 and a medium confidence score is returned in step 1565.

Finally, in step 1570, the combination of organization attribute values are checked for validity. If the name is determined to be invalid, a negative confidence score is returned in step 1571. Otherwise, a 0 confidence score is returned in step 1580. A name element is an invalid organization entity type if the last word of its org name attribute is listed in the authority list 125 as an indicator of another entity type (such as "Act" or "Amendment"). A name element is also an invalid organization if its org name attribute consists of only one word (e.g., "International") which is NOT one of the explicitly listed one-word organization names (e.g. "Congress"), in authority list 125; and it has no organization place or organization tag values.

FIG. 16 describes the place entity-type process 1600. In step 1605 the working copy is examined. If it contains a comma, the words to the right of the comma are checked in step 1610 to see if they constitute a country name, as listed in authority list 125. (Note that U.S. states and Canadian provinces are considered to be countries too.) If the test fails, a negative confidence score is returned in 1611. If it succeeds, the words on the right of the comma become the value of the bigger-place attribute 1722 in step 1620.

In step 1625 the words to the left of the comma are checked to see if they constitute a place name that isn't a country or a continent, as listed in list 125. If the test succeeds, they become the value of the place attribute 1721 in step 1630 and a high confidence score is returned in 1631. The entity-type attribute is set to PLACE. If the test fails, the last word of the working copy is checked in step 1640. If it is an organization tag, the name is invalid as a place name and a negative confidence score is returned in 1641. Else, if there is no tag, the words to the left of the comma are considered to be the value of the place attribute 1642 and a low confidence score is returned in 1643 (e.g., for both "Palo Alto, Calif." and "Xerox, Calif.").

If the working copy does not contain a comma, the process resumes in step 1650. If the whole copy is a place name listed in list 125, it becomes the value of the attribute place 1721 in step 1651 and a high confidence score is returned in 1652. Otherwise, the copy is scanned in step 1655 for a modifier (e.g. "West" or "Greater") on the left. If there is a modifier, and the remainder of the working copy is a known place (according to list 125) in step 1660, the remainder becomes the value of the place attribute 1721 in step 1661 and a high score is returned in 1662. If the remainder is unknown, a negative confidence score is returned in 1663. If there is no modifier, the working copy is scanned in 1665 for a place tag, such as "Mount" or "Lake". If there is no place tag, a negative confidence score is returned in 1666. Otherwise, the entire working copy is taken to be the value of the place attribute. If the tag is ambiguous, such as "Hall" which is both a place indicator but also a common last name, in step 1670, a low confidence score is returned 1671. Otherwise, if the tag is not ambiguous (e.g., "Avenue"), a high score is returned 1672.

FIG. 17 describes the name data structure (the list of name elements) with name elements 1700, 1710 and 1720, with respective organization-person-and place-relevant attributes filled with values as the result of the entity-type processes described above. Name element 1700 returned from the organization entity-type process 1500 with a high score 1704. Its entity-type attribute 1701 is set to ORG; its org-name attribute 1702 is set to "Learning"; its org-tag attribute is set to "Inc." Name element 1710 returned from the person entity-type process 1400 with a high score. Its entity-type value is PERSON. Its gender attribute 1711 is not set because the personal title 1712 is not marked for gender. There is no professional title 1713. The first-name attribute value 1714 is "James"; the middle-name attribute value 1715 is "S."; the nickname attribute 1716, the name-prefix attribute 1717 and the name-suffix attribute 1719 are null, as they were not found in the working copy of the str attribute. The last-name attribute value 1718 is "Smith".

Finally, name element 1720 returned from the place entity-type process 1600 with a high score. Its entity-type value is PLACE. Its place attribute value 1721 is "Somers"; its bigger-place attribute value 1722 is "New York".

As shown in FIG. 17, note that a given name element data structure 410 can have fields for any number of entity types, e.g. org tag for an organization, bigger-place for a place, gender for a person entity type but the entity type of the data structure is ultimately determined after one of the entity type processes adds values to the data structure 410 to give the data structure a specific entity type.

FIG. 18 shows one alternative presentation 1810 of information from the linked list of name elements, 325. 1810 can be displayed as an alternative display 155. It also serves as input to the aggregator processor, described in FIG. 19.

Because the name extraction procedures described thus far operate on the contents of one document at a time, the invention provides for an aggregation processor, 1900 below, which combines the results of processing multiple documents into a single vocabulary list. The goals of aggregation processing include further duplicate elimination and equivalence identification. Subsidiary goals include the selection of the best entity type for an aggregated name, the selection or construction of the best canonical form for an aggregated name, and the detection and elimination of redundant variant strings for an aggregated name. These goals can be achieved because the aggregator processor 1900 processes text over more than one document, preferably multiple documents. This provides a greater text sample for the production of canonical forms.

Figure 19A:
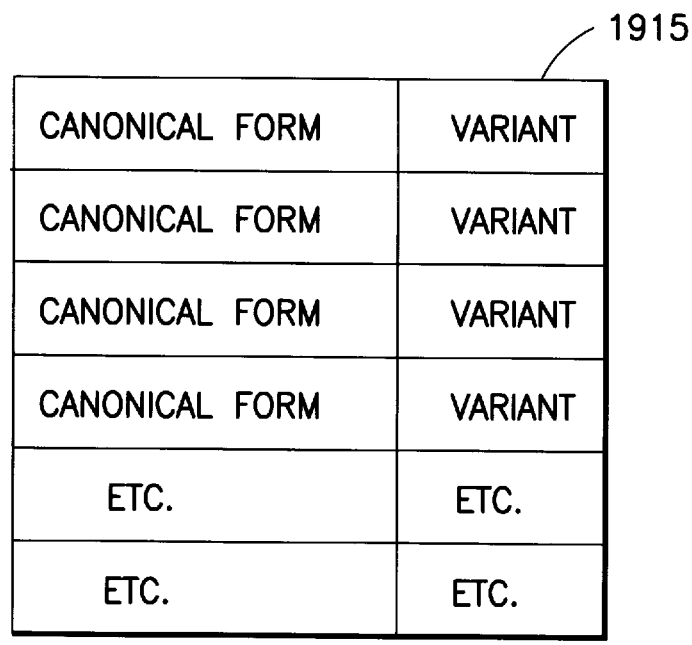
FIG. 19A is a block diagram of an example canonical form variant array.

Aggregator processing 1900 is illustrated in FIG. 19. In one preferred embodiment, the processor accepts, as input 1905, multiple sets of output 1810, on one or more documents, from prior names processing. As described, this output 1810 consists of pairs of canonical forms and variants, marked with an entity type. In step 1910, the aggregator loads these pairs into the canonical form-variant ("CF-Variant") array 1915, the block diagram shown in FIG. 19A, upon which subsequent processing will be based.

The first requirement for aggregator processing is that identical canonical form-variant pairs be removed from the CF-Variant array. In one preferred embodiment, this is accomplished as shown in steps 1920 and 1930. In step 1920, the aggregator sorts the CF-Variant array in such a way that identical pairs are placed next to one another. Then, in step 1930, the duplicate pairs are identified with a sequential scan through the array and the duplicates are eliminated. Once the CF-Variant array is generated 1915, alternative known methods for removing duplicates on a list also be applied to replace steps 1920 and 1930.

Once duplicates are removed, the next requirement is to aggregate different entries in the CF-Variant array that refer to the same entity. This is done across one or more documents. The aggregator 1900 detects entries in the CF-Variant array that refer to the same entity but have different enough strings 415 to initially appear to be different entities. This situation typically arises when the processes described above operation on multiple documents. For example, "President Bill Clinton" and "Governor Bill Clinton" initial appear to be different but are in fact the same entity. This is achieved by the executing the steps 1940, 1950, and 1960.

In step 1940, the CF-Variant array is again sorted, this time into an order designed to put entries that refer to the same entity near one another. The mechanism used to achieve that order is a special comparator used by the sort operation. This comparator functions by comparing normalized forms of the canonical forms in the CF-Variant array.

Normalization involves a number of transformations including, but not limited to, case normalization, observing word separators other than the blank character, morphological normalization (i.e., reduction to lemma forms), ignoring empty words as given in authority list 125. These normalization techniques are well known. For example, see *The C Programming Language* by Brian W. Kernighan and Dennis M. Ritchie, 2nd Edition ("case normalization", "word separators") and *Information Retrieval: Data Structures and Algorithms* by Frakes, William B, and Ricardo Baeza-Yates, Prentice Hall, 1992 ("morphological" and "empty word lists"). Both of these references are incorporated by reference in their entirety.

Empty words are "boiler plate" type words that do not effect the identity of an entry. The definition of empty words is position-dependent. Some words, such as "the", "and", etc. are empty anywhere in a canonical form. Other words, such as "Corporation", "Jr.", "Limited", etc are only empty at the end of a form.

Once the canonical forms in the CF-Variant array are normalized 1940, the CF-Variant array can be inspected by a comparison function to identify entries that are the same. In one preferred embodiment, the comparison function actually sorts the CF-Variant array 1940 and compares 1950 entries that are grouped in a "neighborhood."

In step 1950, rows that are near one another (in the same neighborhood) are inspected to determine whether they refer to the same entity. The definition of "near" is, of course, dependent on the comparison function used in step 1940. In the preferred embodiment, rows are near one another if their canonical forms begin with the same non-empty word, after normalization. For example, the canonical forms "President Bill Clinton" and "Governor Bill Clinton" both begin with the "empty words" President and Governor, respectively. In this example, the empty words "President" and "Governor" are ignored and the two entries are considered to begin with the same non empty word (Bill).

However, other definitions of "near" are contemplated by the inventors. For example, near entries could be defined as those that begin with the same letter or share any non empty word.

Whether two nearby rows refer to the same entity can be determined by yet another application of the canonical form comparator from step 1940, i.e., the inspection of the entries of the neighborhoods. Furthermore, the comparator can select or construct a canonical form that represents the best representative of its comparands. Finally, it can also choose the best entity type from between the types of its comparands. Using these facilities, step 1960 builds a vocabulary item for the name consisting of the best canonical form and entity type from all the nearby CF-Variant rows, together with the combined variants from all of the rows.

The canonical form and entity type of the vocabulary item that results from inspecting a set of CF-Variant rows that are near one another is determined by comparing all of the rows. In the preferred embodiment, this is achieved by a series of pairwise comparisons. The first comparison compares the first two of the set of "near" rows in CF-Variant array. The second comparison compares the third row with the result of the first comparison. Subsequent comparisons compare each succeeding rows with the result of the comparisons on the preceding rows. The process stops when the last of the set of "near" rows in the CF-Variant array has been processed. The actions necessary to choose the canonical form and entity type of the resulting vocabulary item only apply to the comparands of those pairwise comparisons in which the comparands match.

For each pairwise comparison, the comparator chooses a resulting entity type. Using the following legend for entity types, na—categorized name (i.e., ORG, PERSON, PLACE, OTHER)
un—uncategorized name
te—(multi-word) technical term
wo—single word the entity type of the result of aggregating comparands "a" or "b" is selected according to the following table:

|   | b |   |   |   |
|---|---|---|---|---|
| a | na | un | te | wo |
| na | = | a | a | a |
| un | b | = | b | b |
| te | b | a | = | a |
| wo | b | a | b | = |

For each pairwise comparison, the comparator also creates or chooses a resulting canonical form. In the preferred embodiment, the comparator achieves this by inspecting the tokens in the two comparands, in order, and using the rules given below for selecting one of the single tokens to be included in the canonical form. The rules are applied to each pair of non-empty tokens from the comparands. If a token from one of the comparands is an empty word that is not matched in the other comparand, it is omitted from the canonical form. If two different empty words occur in matching positions in the two comparands, then they are both omitted from the canonical form in the preferred embodiment. However, the inventors contemplate other embodiments in which a selection is made between the two empty word tokens, using any of a variety of selection mechanisms. The following rules for choosing a canonical form for a single aggregated token constitute one preferred embodiment for this operation:

1. If the two tokens come from vocabulary items having different categories, and at least one of them is a recognized name, then the form from the higher category is selected.
2. If the two tokens have the same case pattern, then the longer token is selected, unless the longer token is a non-lemma noun derived from the shorter token, in which case we choose the shorter (base) form.
3. If the case patterns of the two tokens is different, the selection is based on the case patterns. Using the following case-pattern legend,
   au—all upper
   iu—initial upper
   al—all lower
   ot—other
a choice is made between tokens "a" or "b", having the indicated case patterns, according to the following table:

|    |    | b  |    |    |
|----|----|----|----|----|
| a  | au | iu | al | ot |
| au |    | b  | b  | b  |
| iu | a  |    | b  | b  |
| al | a  | a  |    | b  |
| ot | a  | a  | a  |    |

4. if one token is "and" and the other token is "&", then the canonical token is "and".

The final requirement for aggregation is that duplicate and redundant variants for a canonical form be eliminated. This is done to eliminate identical or redundant (different morphological forms of the same word) variants of canonical forms that have been aggregated. In a manner similar to that described previously for canonical forms, step 1970 of the preferred embodiment achieves this elimination by (1) sorting the variants for a given canonical form, using a special comparator, (2) re-using the comparator to detect duplicate and redundant variant forms, and (3) eliminating them.

As its final step 1980, the aggregator formats and outputs the aggregated vocabulary items into the name dictionary 1990.

As an example, FIG. 20 shows partial contents of a name dictionary 130A created by aggregator processing applied to the sample input from FIG. 18.

The present invention can be used to populate database tables. Many information providers employ human readers to scan news articles and wires to detect new names of organizations, people or places in the news. Human readers also classify online documents as to what entities they mention. Both these human activities can be significantly aided by using the processors described in this invention.

Mapping names to entities is an important application of this invention. Correct mapping solves the problem of ambiguity—when the same name is used to refer to more than one entity in different places. This can help to increase the accuracy of searches in an information retrieval application. In addition, correct mapping solves the problem of synonymy—when different names are used to refer to the same entity. In information retrieval applications, this invention will simplify the search expression that needs to be formulated, because it will eliminate the need to provide all the variations of a name.

In automatic machine translation applications, identifying all variants of a name as instances of the same canonical form will simplify the translation of proper names. All the variants will map onto one translation.

In spell checking applications, identifying proper names and treating all variants as instances of the same canonical form will reduce the false alarms for misspelling that the checker normally outputs for the user. Once a canonical form was entered into the dictionary, all of its variants will be accepted as correctly spelled as well.

Identifying canonical forms of names is very important for searching for information on the Internet. Because of the diversity of content on the Internet, variants may be ambiguous in many ways that are not contemplated by the user. An application can suggest the different canonical forms that variants map to and the user can use the information to guide the search.

Given this disclosure alternative equivalent embodiments will become apparent to those skilled in the art. These embodiments are also within the contemplation of the inventors.

We claim:

1. A system of one or more computers for processing names in one or more documents of text, the system comprising:
   a central processing unit (CPU) and a memory within each of the computers;
   a database;
   a tokenized text in the form of one or more strings of characters, each string being a token;
   a name data structure having a plurality of named elements, each named element having a string and one or more attributes associated with the string;
   a name extraction processor that scans, selects, and concatenates one or more of the tokens to create a raw name that is entered as a string value in the string of one of the named elements, where the name extraction processor is capable of creating a candidate name from each of one or more of the raw names by one or both of the following name processes: cleaning the string value and splitting the string value.

2. A system, as in claim 1, further comprising a duplicate recognition processor that identifies name elements that are duplicates.

3. A system, as in claim 2, where duplicates are named elements with identical string values.

4. A system, as in claim 2, that further comprises a name dictionary with a plurality of dictionary names and a comparator that compares one or more of the raw names to the one or more of the dictionary names.

5. A system, as in claim 1, where cleaning the string value includes entering attribute values in one or more of the attributes associated with the string.

6. A system, as in claim 5, where a cleaning function is executed by the CPU on the string value if a cleaning condition is met.

7. A system, as in claim 6, where the cleaning function and cleaning condition include any one of the following:
   a. Removing one or more trailing spaces and one or more trailing punctuation marks, if such trailing spaces and punctuation marks exist,
   b. Removing a final "'s" if the final "s" follows a word that is all in upper case,
   c. Removing a final "'s" if the final "s" follows a word that indicates a place name or an organization name, d. Removing a final numeral if the final numeral follows a word that indicates a place name or an organization name, e. Removing date words and one or more function words, ordinal words and numerals if the function words, ordinal words and numerals immediately follow the date word, f. Removing a national adjective if the national adjective is the last word of the raw name, g. Removing one or more function words, ordinal words, and numerals if the function words, ordinal words, and numerals immediately precede the national adjective, h. Removing one or more function words if the function words are the last words of the raw name, i. Removing a hyphen and a lower-case word if the hyphen and lower case word follow a capitalized word, j. Removing one or more spaces if the spaces occur as the first characters in the raw name, k. Removing one or more punctuation marks if the punctuation marks occur as the first characters in the raw name, l. Removing the raw name if the raw name is a geographical modifier followed by a national adjective, m. Removing the raw name if the raw name is a national adjective, n. Removing the raw name if the raw name only comprises: zero or more lowercase characters, zero or more punctuation marks, zero or more spaces and zero or more numbers.

8. A system, as in claim 6, further comprising an authority list with one or more words, where the cleaning function and cleaning condition include any one of the following:

a. Removing a final "'s" if the "s" follows a word from the authority list that would indicate that the raw name is a place name or an organization name, b. Removing one or more final numbers if the final numbers follow a word from the authority list that indicates that the raw name is a place name or an organization name, c. Removing the last word of the raw name if the last word is on the authority list as an ambiguous date word, d. Removing one or more function words the function words precede the ambiguous data word, e. Removing a non-name word if the non-name word is listed on the authority list as a word that can not constitute a name on its own, f. Removing a non-name word and one or more function words following the non-name word if the non-name word is listed on the authority list as a word that can not constitute a name on its own and the non-name word is followed by one or more function words.

9. A system, as in claim 5, where a splitting function is executed by the CPU on the string value if a splitting condition is met.

10. A system, as in claim 9, where the raw name is scanned from right to the left and the splitting function and splitting condition include any of the following:

a. Splitting the raw name into a left part preceding an "and" and a right part following the "and", if the raw name contains the "and" followed by an all upper-case word;

b. Splitting the raw name into a left part preceding the "and" and a right part following the "and", if the raw name contains the "and" preceded by an all upper-case word;

c. Splitting the raw name into a left part preceding "and," and a right part following the "and,", if the raw name contains "and,";

d. Splitting the raw name into a left part preceding "and the" and a right part following the "and the", if the raw name contains "and the";

e. Splitting the raw name into a left part preceding the "and" and a right part following the "and", if the raw name contains a place name in the right part;

f. Splitting the raw name into a left part preceding the "and" and a right part following the "and", if the raw name contains a human place name in the right part;

g. Splitting the raw name into a left part preceding the "and" and a right part following the "and", if the raw name contains "and" and the left part and right part are organization names with a similar scope strength;

h. Splitting the raw name into a left part preceding any one of an "'s" and "to" if the raw name contains "'s" or "to" and a place name or a human name in the right part;

i. Splitting the raw name into a left part preceding the "'s" and a right part following the "'s", if the raw name contains a possessive "'s" and a place name at the end of the left part;

j. Splitting the raw name into a left part preceding any one of an "of" and an "in" and a right part following the "of" and "in", if the raw name contains "of" or "in" and the symbol "&" to the right of the "of" and "in";

k. Splitting the raw name into a left part preceding any of an "of" and "in" and a right part following the "of" or the "in", if the raw name contains the "of" or "in" and a human name in the left part;

l. Splitting the raw name into a left part preceding a comma and a right part following the comma, if the raw name contains a comma and a place name in the left part;

m. Splitting the raw name into a left part preceding a comma and a right part following a comma, if the raw name contains the comma and an adjective at the beginning of the right part;

n. Splitting the raw name into a left part preceding ", and" and a right part following ", and", if the raw name contains ", and" and a human name in the right part, o. Splitting the raw name into a left part preceding ", and" and a right part following ", and", if the raw name contains ", and" and an organization name in the left part with low scope strength, p. Splitting the raw name into a left part preceding a left parenthesis and a right part following the left parenthesis, if the raw name contains a left parenthesis but does not contain a right parenthesis to the right of the left parenthesis; and q. Splitting the raw name into a left part preceding a right parenthesis and a right part following the right parenthesis, if the raw name contains a right parenthesis but does not contains a left parenthesis to the left of the right parenthesis.

11. A system, as in claim 9, where the raw name is scanned from left to the right and the splitting function and splitting condition include any of the following:

a. Splitting the raw name into a left part preceding a comma and a right part following the comma, if the raw name contains the comma followed by an optional "and" and the left part is a human name or place name;

b. Splitting the raw name into a left part preceding the comma and a right part following the comma, if the raw name contains the comma and a place name on the left of the comma;

c. Splitting the raw name into a left part preceding a "to" and a right part following the "to", if the raw name contains the "to" and a place name on the left of the "to";

d. Splitting the raw name into a left part preceding any one of a "of" and a "in" and a right part following the "of" and the "in", if the raw name contains the "of" or "in" and a human on the left of the "of" and the "in"; and e. Splitting the raw name into a left part preceding an "'s" and a right part following the "'s", if the raw name contains the "'s" and a place name on the left of the "'s".

12. A system, as in claim 1, where one or more of the computers is a client connected by a network to one or more other computers that is a server.

13. A system, as in claim 12, where the network is the internet.

14. A system, as in claim 12, where the network is an intranetwork.

15. A method of identifying one or more proper names, the proper names appearing in one or more documents in a database, comprising the steps of:

a. scanning one of the documents to select one or more tokens of text;

b. concatenating one or more of the tokens to create a raw name having zero or more proper names, zero or more medial substrings, zero or more leading substrings, and zero or more trailing substrings;

c. cleaning each of the raw names by removing the leading and trailing substrings if a cleaning condition is met;

d. splitting the candidate name at the medial substring if a splitting condition is met; and e. repeating steps c and d until no more cleaning conditions and splitting conditions are met, the candidate name being a final candidate.

16. A method, as in claim 15, where the final candidate is compared to one or more words in a dictionary in a memory of a computer.

* * * * *